US012240242B2

(12) United States Patent
Kondo et al.

(10) Patent No.: US 12,240,242 B2
(45) Date of Patent: Mar. 4, 2025

(54) LIQUID DISCHARGING APPARATUS

(71) Applicant: SEIKO EPSON CORPORATION, Tokyo (JP)

(72) Inventors: Shomaru Kondo, Shimosuwa-machi (JP); Yoshikane Tsuchihashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 17/809,882

(22) Filed: Jun. 29, 2022

(65) Prior Publication Data

US 2023/0001695 A1 Jan. 5, 2023

(30) Foreign Application Priority Data

Jun. 30, 2021 (JP) ................................ 2021-108345
Jun. 30, 2021 (JP) ................................ 2021-108362

(51) Int. Cl.
*B41J 2/165* (2006.01)

(52) U.S. Cl.
CPC ....... *B41J 2/16535* (2013.01); *B41J 2/16505* (2013.01); *B41J 2/16585* (2013.01); *B41J 2002/16591* (2013.01)

(58) Field of Classification Search
CPC ......................... B41J 2/16535; B41J 2/16505; B41J 2/16585; B41J 2002/16591
See application file for complete search history.

(56) References Cited

U.S. PATENT DOCUMENTS 5,880,448 A * 3/1999 Hetzer ................ B41J 2/16517
705/401
2016/0271955 A1 9/2016 Ono et al.

FOREIGN PATENT DOCUMENTS

JP H10-034951 2/1998
JP 2016-175275 10/2016
JP 2021-059123 4/2021

* cited by examiner

*Primary Examiner* — Geoffrey S Mruk
(74) *Attorney, Agent, or Firm* — WORKMAN NYDEGGER

(57) ABSTRACT

A liquid discharging apparatus includes a liquid discharging head that discharges a liquid onto a medium, a wiping mechanism that wipes a liquid discharging surface of the liquid discharging head and has a wiper portion that moves along an axis that is along the liquid discharging surface and wipes the liquid discharging surface, and an electric portion that is a portion related to controlling the liquid discharging apparatus includes at least one circuit substrate, in which a first direction along the axis the intersects a surface of the circuit substrate, and in the first direction, at least a part of the electric portion overlaps a part of the wiping mechanism.

16 Claims, 15 Drawing Sheets

LIQUID DISCHARGING APPARATUS

The present application is based on, and claims priority from JP Application Serial Number 2021-108345, filed Jun. 30, 2021 and JP Application Serial Number 2021-108362, filed Jun. 30, 2021, the disclosures of which are hereby incorporated by reference herein in their entirety.

BACKGROUND

1. Technical Field

The present disclosure relates to a liquid discharging apparatus that discharges a liquid onto a medium.

2. Related Art

In an ink jet printer as an example of a liquid discharging apparatus, a wiping mechanism that wipes an ink discharging surface of an ink discharging head is provided. In the ink jet printer described in JP-A-2016-175275, a wiper is referred to as a wiping member, and the wiping member is provided in a wiping unit. The wiping unit moves in a direction along the ink discharging surface of the ink discharging head by obtaining power of a motor and, in a process of this movement, wipes the ink discharging surface of the ink discharging head. A cover is provided on the back side of the ink jet printer, and by opening the cover, the wiping member can be accessed. The wiping member is fixed to the wiping unit by a screw, and by removing the screw, the wiping member can be taken out to the outside of the apparatus.

In addition, as described in JP-A-2016-175275, in some cases, a recording apparatus has an electric member that is exposed when a back cover constituting the housing of the apparatus is opened. The electric member in JP-A-2016-175275 is configured as a unit body including a circuit substrate.

Depending on the configuration of the wiping member or the configuration of the electric member, the size of the apparatus tends to increase. For example, in a configuration in which, as described above, the wiping member moves in a direction along the ink discharging surface of the ink discharging head, the moving area of the wiping member needs to be reserved even outside the ink discharging area, as a result of which the size of the apparatus tends to increase in the moving direction of the wiping member. As another example, from the view point of apparatus manufacturing and convertibility, it is preferable to make a unit for each circuit substrate having a different function. However, for electrically coupling units adjacent to each other, a space between the units required for providing an electrically coupling portion such as a connector becomes large, as a result of which the size of the apparatus tends to increase.

SUMMARY

The present disclosure is a liquid discharging apparatus including a liquid discharging head that discharges a liquid onto a medium, a wiping mechanism that wipes a liquid discharging surface of the liquid discharging head and has a wiper portion that moves along an axis that is along the liquid discharging surface and wipes the liquid discharging surface, and an electric portion that is a portion related to controlling the liquid discharging apparatus and includes at least one circuit substrate, wherein a first direction along the axis intersects a surface of the circuit substrate, and in the first direction, at least a part of the electric portion overlaps a part of the wiping mechanism.

DESCRIPTION OF EXEMPLARY EMBODIMENTS

Figure 1:
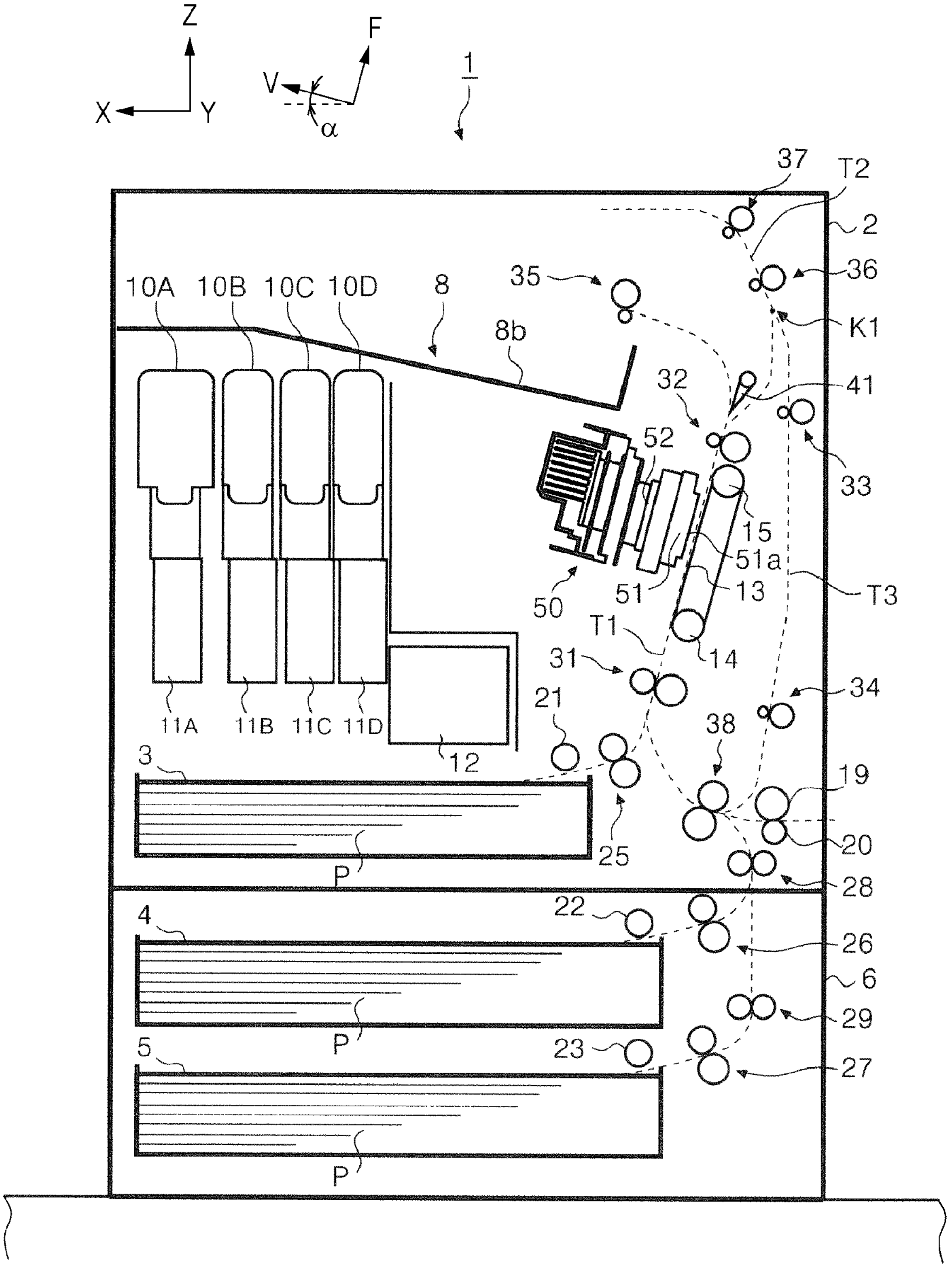
FIG. 1 is a diagram illustrating a medium transportation path in a printer.

Hereinafter, the present disclosure will be schematically described. A liquid discharging apparatus according to the first aspect includes a liquid discharging head that discharges a liquid onto a medium, a wiping mechanism that wipes a liquid discharging surface of the liquid discharging head and has a wiper portion that moves along an axis that is along the liquid discharging surface and wipes the liquid discharging surface, and an electric portion that is a portion related to controlling the liquid discharging apparatus and includes at least one circuit substrate, wherein a first direction along the axis intersects a surface of the circuit substrate, and in the first direction, at least a part of the electric portion overlaps a part of the wiping mechanism.

According to this aspect, since, in the first direction, at least a part of the electric portion overlaps a part of the wiping mechanism, the apparatus dimension in the first direction can be suppressed, and the size of the apparatus can be reduced. The first direction can be said to be a moving direction of the wiper unit. Note that since, in the first direction, at least a part of the electric portion overlaps a part of the wiping mechanism, it can be said that, in the first direction, the position of at least a part of the electric portion and the position of a part of the wiping mechanism are the same. Alternatively, since, in the first direction, at least a part of the electric portion overlaps a part of the wiping mechanism, it can be said that, when viewed in a direction intersecting the first direction, at least a part of the electric portion appears to overlap a part of the wiping mechanism.

The second aspect is the liquid discharging apparatus according to the first aspect, in which the wiper portion is configured to move between a home position and a wiping area where the wiper portion wipes the liquid discharging surface, and, when the wiper portion is located at the home position, at least a part of the electric portion overlaps at least a part of the wiper portion in the first direction.

According to this aspect, the effect of the first aspect described above can be obtained from a configuration in which the wiper portion is configured to move between the home position and the wiping area where the wiper portion wipes the liquid discharging surface, and, when the wiper portion is located at the home position, at least a part of the electric portion overlaps at least a part of the wiper portion in the first direction.

The third aspect is the liquid discharging apparatus according to the first or the second aspect, in which the first direction is an apparatus depth direction that is a direction from a front side of an apparatus main body to a back side of the apparatus main body. According to this aspect, since the first direction, which is the moving direction of the wiper unit, is the apparatus depth direction, the apparatus dimension in the apparatus depth direction can be suppressed.

The fourth aspect is the liquid discharging apparatus according to the third aspect, in which the electric portion is located at the back side in the apparatus depth direction, the at least one circuit substrate comprises a power substrate and a control substrate, the power substrate and the control substrate are provided at an interval in the apparatus depth direction, the power substrate is provided in a power unit that constitutes the electric portion, and the control substrate is provided in a control unit that constitutes the electric portion and is located at an apparatus back side of the apparatus main body with respect to the power unit. According to this aspect, in a configuration including the power substrate and the control substrate in the apparatus depth direction, the apparatus dimension in the apparatus depth direction can be suppressed.

The fifth aspect is the liquid discharging apparatus according to the fourth aspect, further comprising a back cover that forms an apparatus back side and is configured to be attached or removed with respect to the apparatus main body, in which when the back cover is removed, the wiping mechanism and the control unit are exposed. According to this aspect, since, by removing the back cover that forms the apparatus back side, the wiping mechanism and the control unit are exposed, maintenance performance of the wiping mechanism and the control unit, that is, the electric portion, improves.

The sixth aspect is the liquid discharging apparatus according to the fifth aspect, in which the power unit is configured to be attached or removed with respect to the apparatus main body, and the control unit is configured to be opened or closed and, when the control unit is opened, the power unit is exposed and is configured to be attached or removed with respect to the apparatus main body. According to this aspect, since the control unit is configured to be opened or closed, and, as the control unit is opened from a closed state, the power unit is exposed and is configured to be attached or removed, when the power unit is attached or removed, a storage space for the control unit becomes unnecessary, and workability when the power unit is attached or removed improves.

The seventh aspect is the liquid discharging apparatus according to any one of the first to the sixth aspects, in which a high voltage substrate that handles a higher voltage than a voltage that the electric portion handles is provided outside the electric portion in a direction intersecting the first direction. According to this aspect, since the high voltage substrate that handles a higher voltage than a voltage that the electric portion handles is provided outside the electric portion in a direction intersecting the first direction, noise generated from the high voltage substrate can be suppressed from adversely affecting the electric portion.

The eighth aspect is the liquid discharging apparatus according to the seventh aspect, further including a transportation belt that transports the medium and is provided at a position facing the liquid discharging head, in which the high voltage substrate controls an electrical charge of the transportation belt, and the high voltage substrate is located at a lateral side of the transportation belt. According to this aspect, since the high voltage substrate is a substrate that controls an electrical charge of the transportation belt, and the high voltage substrate is located at a lateral side of the transportation belt, the disposition distance between the high voltage substrate and the transportation belt can be reduced and, in addition, the length of wiring required for electrifying the transportation belt can be reduced.

The ninth aspect is the liquid discharging apparatus according to any one of the first to the eighth aspects, in which a head driving substrate that drives the liquid discharging head is provided above the liquid discharging head.

According to this aspect, since the head driving substrate that drives the liquid discharging head is provided outside the electric portion and above the liquid discharging head, noise generated form the electric portion can be suppressed from adversely affecting the driving substrate.

The tenth aspect is the liquid discharging apparatus according to any one of the first to the third aspects, in which a cut-away section is formed on the at least one circuit substrate to avoid the wiping mechanism. According to this aspect, since the cut-away section is formed on the circuit substrate to avoid the wiping mechanism, this means that the circuit substrate is disposed by effectively using a space around the wiping mechanism, as a result of which the size of the apparatus can be reduced.

The eleventh aspect is the liquid discharging apparatus according to any one of the first to the third aspects, in which the at least circuit substrate comprises a first circuit substrate that is provided while being oriented along a side of the apparatus main body and a second circuit substrate that is located on an apparatus inner side with respect to the first circuit substrate and is provided while being oriented along a surface of the first circuit substrate, the electric portion includes a first unit that includes the first circuit substrate and a second unit that includes the second circuit substrate and is disposed to face the first unit, the first unit includes a connector at a position facing the second unit, and the second unit includes a recess at a position facing the connector.

According to this aspect, in a configuration in which the first unit and the second unit are disposed so as to face each other, the first unit includes a connector at a position facing the second unit and the second unit includes a recess at a position facing the connector. As a result, a space required for arranging a cable after the cable is coupled to the connector, that is, a space between the first unit and the second unit can be reduced, and the size of the apparatus can be suppressed from increasing.

The twelfth aspect is the liquid discharging apparatus according to the eleventh aspect, in which the recess extends in a direction intersecting an overlapping direction of the first unit and the second unit. The overlapping direction can be said to be the first direction or the apparatus depth direction. According to this aspect, since the recess extends in the direction intersecting the overlapping direction of the first unit and the second unit, a cable can be arranged inside the recess, a space for arranging the cable between the first unit and the second unit can be suppressed, and the size of the apparatus can be reduced.

The thirteenth aspect is the liquid discharging apparatus according to the eleventh or the twelfth aspect, in which, in an overlapping direction of the first unit and the second unit, at least a part of the recess overlaps at least a part of an electronic component included in the second circuit substrate.

According to this aspect, since, in the overlapping direction of the first unit and the second unit, at least a part of the recess overlaps at least a part of the electronic component included in the second circuit substrate, the dimension of the second unit in the overlapping direction can be suppressed, and in addition, the apparatus dimension in the overlapping direction can be suppressed. Note that since, in the overlapping direction, at least a part of the recess overlaps at least a part of the electronic component, it can be said that, in the overlapping direction, the position of at least a part of the recess and the position of at least a part of the electronic component are the same. Alternatively, since, in the overlapping direction, at least a part of the recess overlaps at least a part of the electronic component, it can be said that, when viewed in a direction intersecting the overlapping direction, at least a part of the recess appears to overlap at least a part of the electronic component.

The fourteenth aspect is the liquid discharging apparatus according to any one of the eleventh to the thirteenth aspects, comprising a fan that generates an airflow inside the second unit, in which the second circuit substrate includes a heat sink at a position facing a back side of the recess.

The portion where the recess is provided inside the second unit has a narrow space, and the flow velocity of the airflow generated inside the unit by the fan is increased compared with those in other portions. In this aspect, this property is utilized, and at least one of a heat member and a heat sink is provided at a position, in the second circuit substrate, facing the back side of the recess, as a result of which the heat dissipation efficiency can be improved.

The fifteenth aspect is the liquid discharging apparatus according to the fourteenth aspect, further including a duct that exhausts air from the second unit, in which the duct extends from the second unit to a lateral side of the apparatus main body via a lateral side of the first unit.

Hereinafter, the present disclosure is specifically described. In the following description, an ink jet printer 1 that performs recording by discharging ink, which is an example of a liquid, onto a medium represented by recording paper will described as an example of a liquid discharging apparatus or a recording apparatus. Hereinafter, the ink jet printer 1 is abbreviated as a printer 1. Note that the X-Y-Z coordinate system indicated in each figure is an orthogonal coordinate system, and the Y-axis direction is a direction intersecting a transportation direction of the medium, that is, a medium width direction and also an apparatus depth direction. In addition, in the present embodiment, the Y-axis direction is a moving direction of a wiper portion 43 described later. The +Y direction of the Y-axis direction is a direction from the apparatus front side to the apparatus back side, and the −Y direction is a direction from the apparatus back side to the apparatus front side.

The X-axis direction is the apparatus width direction, and when viewed from the operator of the printer 1, the +X direction is the left side and the −X direction is the right side. The Z-axis direction is the vertical direction and is the apparatus height direction. The +Z direction of the Z-axis direction is upward and the −Z direction is downward. Hereinafter, the direction in which the medium is sent may be referred to as downstream, and the direction opposite thereto may be referred to as upstream. In addition, in FIGS. 1 and 2, medium transportation paths are indicated by broken lines. In the printer 1, the medium is transported through the medium transportation paths indicated by broken lines.

Figure 2:
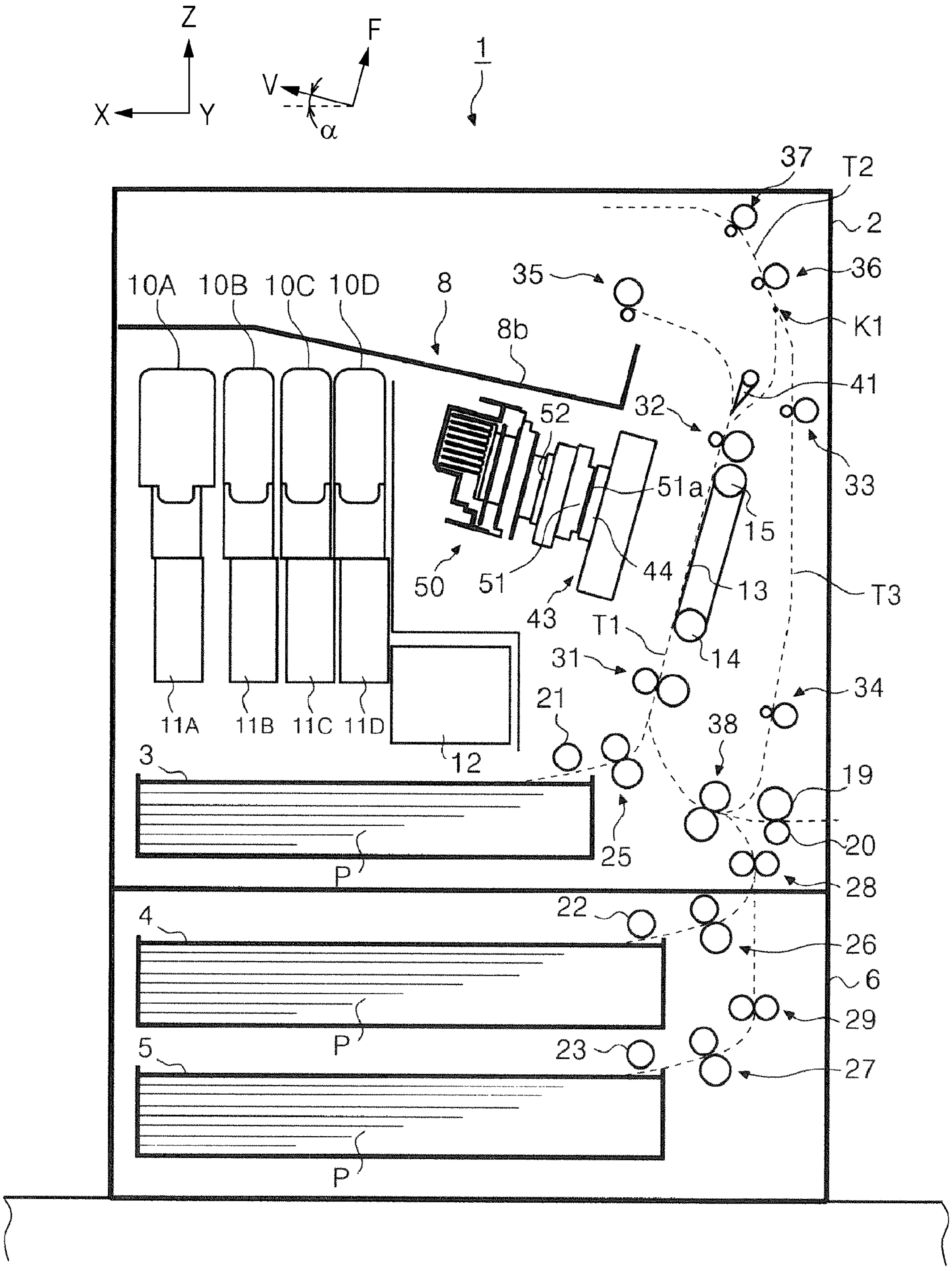
FIG. 2 is a diagram illustrating the medium transportation path in the printer.

In addition, in FIGS. 1 and 2, the F-axis direction is the medium transportation direction between a line head 51 and a transportation belt 13 described later, that is, in a recording area, the +F direction is downstream of the transportation direction, and the −F direction opposite thereto is upstream of the transportation direction. In addition, the V-axis direction is a direction orthogonal to the F-axis direction and is the moving direction of a head unit 50, which is an example of a recording unit described later. The +V direction of the V-axis direction is a direction in which the head unit 50 retreats from a transportation path during recording T1, and the −V direction is a direction in which the head unit 50 advances to the transportation path during recording T1.

Hereinafter, with reference to FIGS. 1 and 2, medium transportation paths in the printer 1 will be described. The printer 1 is configured such that an extension unit 6 can be coupled to the lower portion of an apparatus main body 2, and FIGS. 1 and 2 illustrate a state in which the extension unit 6 is coupled. The apparatus main body 2 includes a first medium cassette 3 that accommodates a medium in the lower portion, and when the extension unit 6 is coupled, a second medium cassette 4 and a third medium cassette 5 can be provided below the first medium cassette 3.

For each medium cassette, a pick roller that feeds a medium accommodated in the −X direction is provided. Pick rollers 21, 22, and 23 are provided for the first medium cassette 3, the second medium cassette 4, and the third medium cassette 5, respectively. In addition, for each medium cassette, pairs of feeding rollers that feed, obliquely upward, the medium transported in the −X direction are provided. Pairs of feeding rollers 25, 26, and 27 are provided for the first medium cassette 3, the second medium cassette 4, and the third medium cassette 5, respectively. Note that hereinafter, unless otherwise noted, “a pair of rollers” is configured with a driving roller driven by a motor (not illustrated) and a driven roller driven and rotated in contact with the driving roller.

The medium fed from the third medium cassette 5 is transported to a pair of transportation rollers 38 by pairs of transportation rollers 29 and 28. In addition, the medium transported from the second medium cassette 4 is transported to the pair of transportation rollers 38 by the pair of transportation rollers 28. The medium is nipped by the pair of transportation rollers 38 and transported to a pair of transportation rollers 31. The medium fed by the first medium cassette 3 is transported to the pair of the transportation rollers 31 without passing through the pair of transportation rollers 38. Note that a supply roller 19 and a separation roller 20 provided near the pair of transportation rollers 38 form a pair of rollers that feeds the medium from a supply tray (not illustrated in FIG. 1).

The medium that receives a feeding force from the pair of transportation rollers 31 is transported to a space between the line head 51, which is an example of a liquid discharging head, and the transportation belt 13, that is, at a recording position facing the line head 51. Note that hereinafter, the medium transportation path from the pair of transportation rollers 31 to a pair of transportation rollers 32 is referred to as the transportation path during recording T1.

The line head 51 constitutes the head unit 50, which is an example of a recording unit that performs recording on the medium. The line head 51 executes recording by discharging ink, which is an example of a liquid, to a surface of the medium. The line head 51 is an ink discharging head configured such that a nozzle that discharges ink covers the entire area in the medium width direction and is configured as an ink discharging head capable of performing recording in the entire medium width area without moving in the medium width direction.

The head unit 50 is provided so as to be capable of being caused to advance and retreat with respect to the transportation path during recording T1 by a rack and pinion mechanism and a motor (not illustrated) and provided so as to be movable between a position where the head unit 50 mostly advances to the transportation path during recording T1 and a position where the head unit 50 is mostly retreated from the transportation path during recording T1. FIG. 1 indicates a state in which the head unit 50 mostly advances to the transportation path during recording T1, and in this state, recording is performed on the medium. FIG. 2 indicates the position of the head unit 50 when an ink discharging surface 51*a* of the line head 51 is wiped. The ink discharging surface 51*a* is an example of the liquid discharging surface.

A wiper 44 is provided in a wiper portion 43. The wiper 44 is formed of an elastic material such as rubber and elastomer and can be pressed against the ink discharging surface 51*a* by the elasticity. The wiper portion 43 is provided so as to be movable in the Y-axis direction, which is an example of a direction along the ink discharging surface 51*a*, by a motor 46 (see FIG. 7) and is located at a home position, which is an end position of the moving area in the +Y direction, except during wiping.

Figure 7:
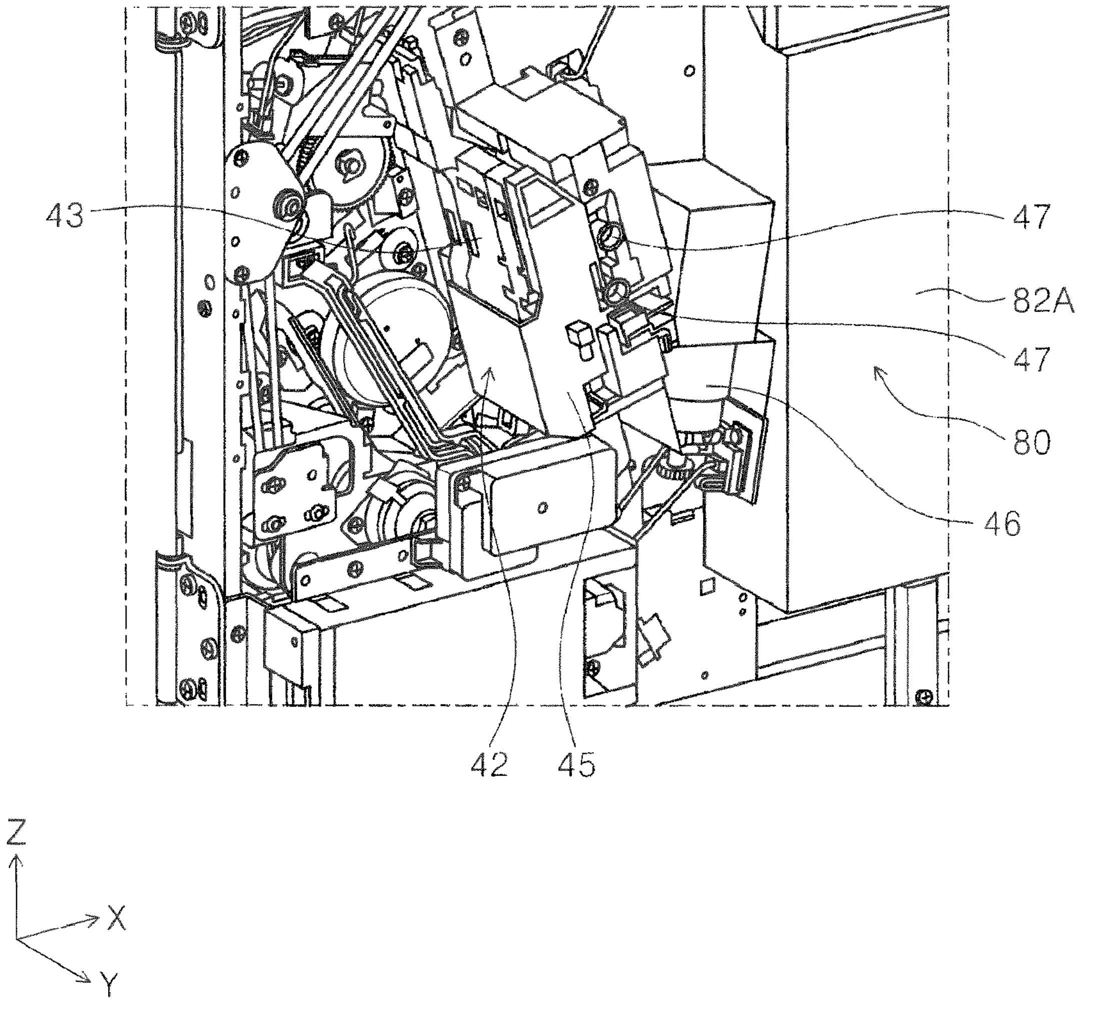
FIG. 7 is a perspective view around a wiping mechanism in a state in which a high voltage unit is removed from the state illustrated in FIG. 6.

At the home position of the wiper portion 43, as illustrated in FIG. 7, a coupling unit 45 is disposed. The coupling unit 45 is included in a wiping mechanism 42 together with the wiper portion 43. Note that the apparatus main body 2 includes a moving means (not illustrated) that moves the wiper portion 43 in the Y-axis direction. This moving means (not illustrated) is configured by, for example, a guide rail. The moving means can be considered as a constituent element of the wiping mechanism 42. The coupling unit 45 is provided while being fixed, unlike the wiper portion 43. The coupling unit 45 is provided with a suction needle (not illustrated). When the wiper portion 43 moves to the home position, the suction needle enters a suction hole (not illustrated) on a side of the wiper portion 43. The wiper portion 43 is provided with a storage portion (not illustrated) that stores ink. The suction needle communicates with a pump (not illustrated). Accordingly, when the wiper portion 43 moves to the home position, the pump can suck and collect ink stored in the wiper portion 43.

Next, returning to FIGS. 1 and 2, ink storage portions 10A, 10B, 10C, and 10D serve as liquid storage portions. Ink to be discharged from the line head 51 is supplied from each of the ink storage portions to the line head 51 via a tube (not illustrated). The ink storage portions 10A, 10B, 10C, and 10D are provided so as to be attached to or removed from mounting portions 11A, 11B, 11C, and 11D, respectively. In addition, a waste liquid storage portion 12 stores ink as a waste liquid that has been discharged from the line head 51 toward a flushing cap (not illustrated) for maintenance.

The transportation belt 13 is provided at a position facing the line head 51. The transportation belt 13 is an endless belt disposed around a pulley 14 and a pulley 15 and is rotated as at least one of the pulley 14 and the pulley 15 is driven by a motor (not illustrated). The medium is transported at a position facing the line head 51 while clinging onto a belt surface of the transportation belt 13.

The transportation belt 13 is an endless belt formed of a base material made of urethane, rubber, and the like containing a conductive material, and a predetermined tension is given to the transportation belt 13 by a tensioner (not illustrated). At a position facing the pulley 14 across the transportation belt 13, a charging roller (not illustrated) is provided. The charging roller is in contact with the outer surface of the transportation belt 13 and is driven and rotated as the transportation belt 13 rotates. A DC voltage is applied to the charging roller from a high voltage unit 90 (see FIG. 5), as a result of which the charging roller supplies an electrical charge to a portion in contact with the transportation belt 13. For example, the charging roller supplies a positive charge to the transportation belt 13 so as to charge the outer surface of the transportation belt 13 to have a positive polarity. Accordingly, the outer surface of the transportation belt 13 becomes an adherence surface onto which the medium clings.

Next, the transportation path during recording T1 that passes through the position facing the line head 51 is configured to intersect both the horizontal direction and the vertical direction and transports the medium upward. Accordingly, the V-axis direction, which is the moving direction of the head unit 50, also intersects both the horizontal direction and the vertical direction, an inclination angle α in the V-axis direction with respect to the horizontal direction is smaller than 45°, and more specifically, approximately 15°. With such a configuration, the size of the space required for movement of the head unit 50 in the horizontal direction and the vertical direction can be balanced, and the size of the apparatus can be suppressed from extremely increasing in the horizontal direction and the vertical direction. Note that the present disclosure is not limited to the above-described configuration. The V-axis direction may be parallel to the horizontal direction, or the V-axis direction may be parallel to the vertical direction.

In addition, the present disclosure includes a discharge tray 8 that is provided in the +Z direction from the head unit 50 and forms a supporting surface 8*b* for supporting the medium discharged from the medium transportation path, and the supporting surface 8*b* extends in the V-axis direction, which is the moving direction of the head unit 50. As a result, no wasted space is formed in the relationship between the discharge tray 8 and the moving area of the head unit 50, and the size of the apparatus is suppressed from increasing. In addition, since a part of the head unit 50 overlaps the ink storage portions 10A to 10D in the Z-axis direction, the device dimension in the Z-axis direction can be suppressed.

Next, the medium on which recording has been performed on a first surface by the line head 51 is transported further upward by the pair of transportation rollers 32 located downstream of the transportation belt 13. A flap 41 is provided downstream of the pair of transportation rollers 32, and the flap 41 switches the transportation direction of the medium. When the medium is discharged as is, the flap 41 switches the transportation path of the medium such that the medium is transported upward toward a pair of transportation rollers 35, and the medium is discharged toward the discharge tray 8 by the pair of transportation rollers 35.

When recoding is performed on a second surface in addition to the first surface of the medium, the transportation direction of the medium is directed toward a branching position K1 by the flap 41. Next, the medium passes through the branching position K1 and enters a switch-back path T2. In the present embodiment, the switch-back path T2 is a medium transportation path above the branching position K1. Pairs of transportation rollers 36 and 37 are provided in the switch-back path T2. The medium that has entered the switch-back path T2 is transported upward by the pairs of transportation rollers 36 and 37, and after the lower edge of the medium passes through the branching position K1, the rotation direction of the pairs of transportation rollers 36 and 37 is switched, as a result of which the medium is transported downward.

A reverse path T3 is coupled to the switch-back path T2. In the present embodiment, the reverse path T3 is a medium transportation path from the branching position K1 to the pair of transportation rollers 38 through pairs of transportation rollers 33 and 34. The medium that has been transported downward from the branching position K1 receives a feeding force from the pairs of transportation rollers 33 and 34, reaches the pair of transportation rollers 38, is curved and reversed, and transported to the pair of transportation rollers 31.

After the medium is transported to a position facing the line head 51 again, the second surface of the medium on the opposite side of the first surface, on which recording has already been performed, faces the line head 51. As a result, recording on the second surface of the medium can be performed by the line head 51.

Figure 3:
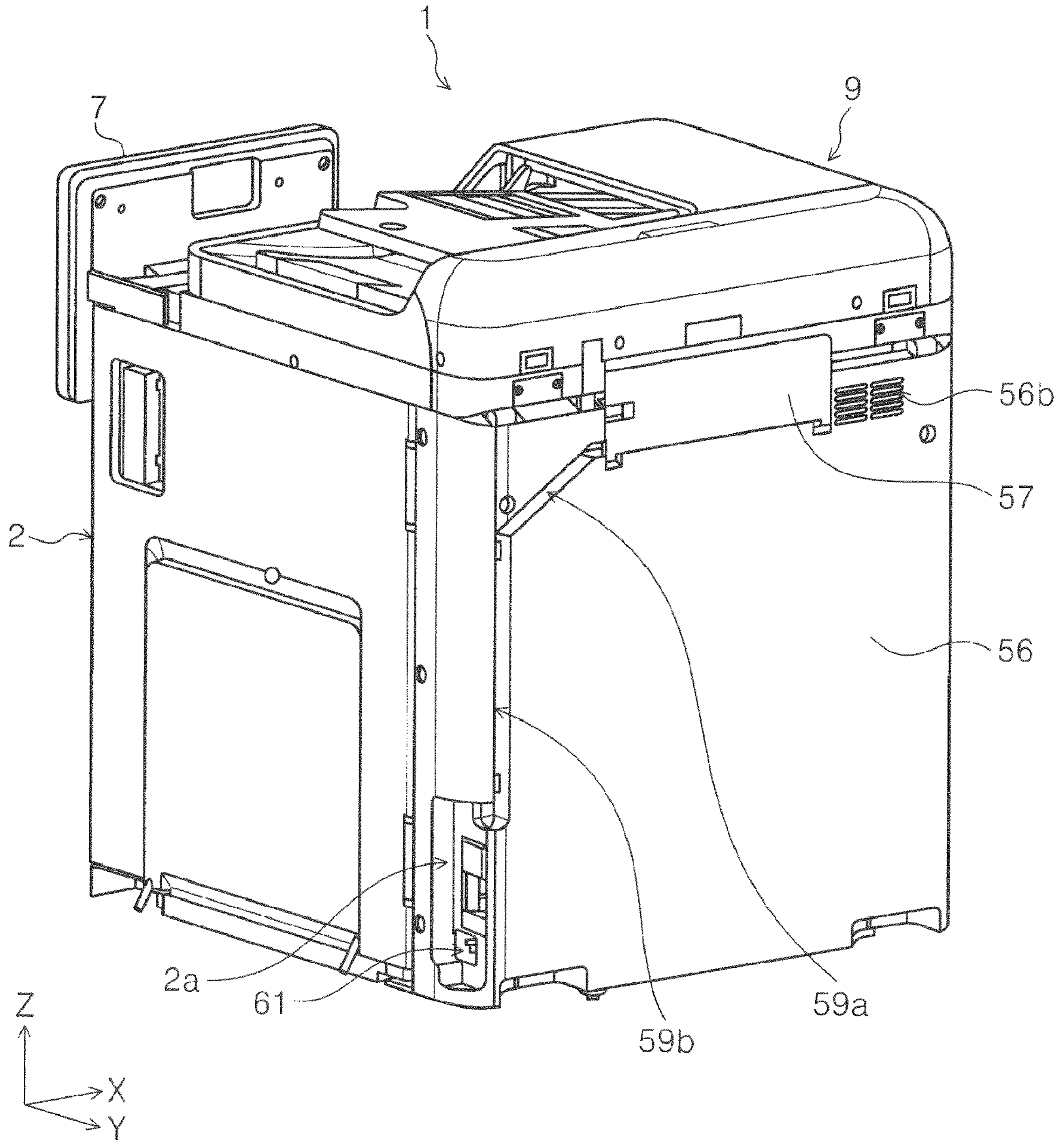
FIG. 3 is a perspective view illustrating a back side, which is one side of the printer.

Next, with reference to FIG. 3 and the subsequent figures, an electric portion 60 will be described. As described in FIG. 3, on the back side, which is one side of the apparatus main body 2, a back cover 56 is provided. The back cover 56 is a part of a housing constituting the outer shell of the apparatus main body 2. Note that in FIG. 3, a scanner unit 9 is provided in an upper portion of the apparatus main body 2, and an operation panel 7 is provided in a front side upper portion of the apparatus main body 2. The back cover 56 is fixed to the apparatus main body 2 by a screw (not illustrated), that is, the back cover 56 is provided so as to be attached to or removed from the apparatus main body 2.

Figure 4:
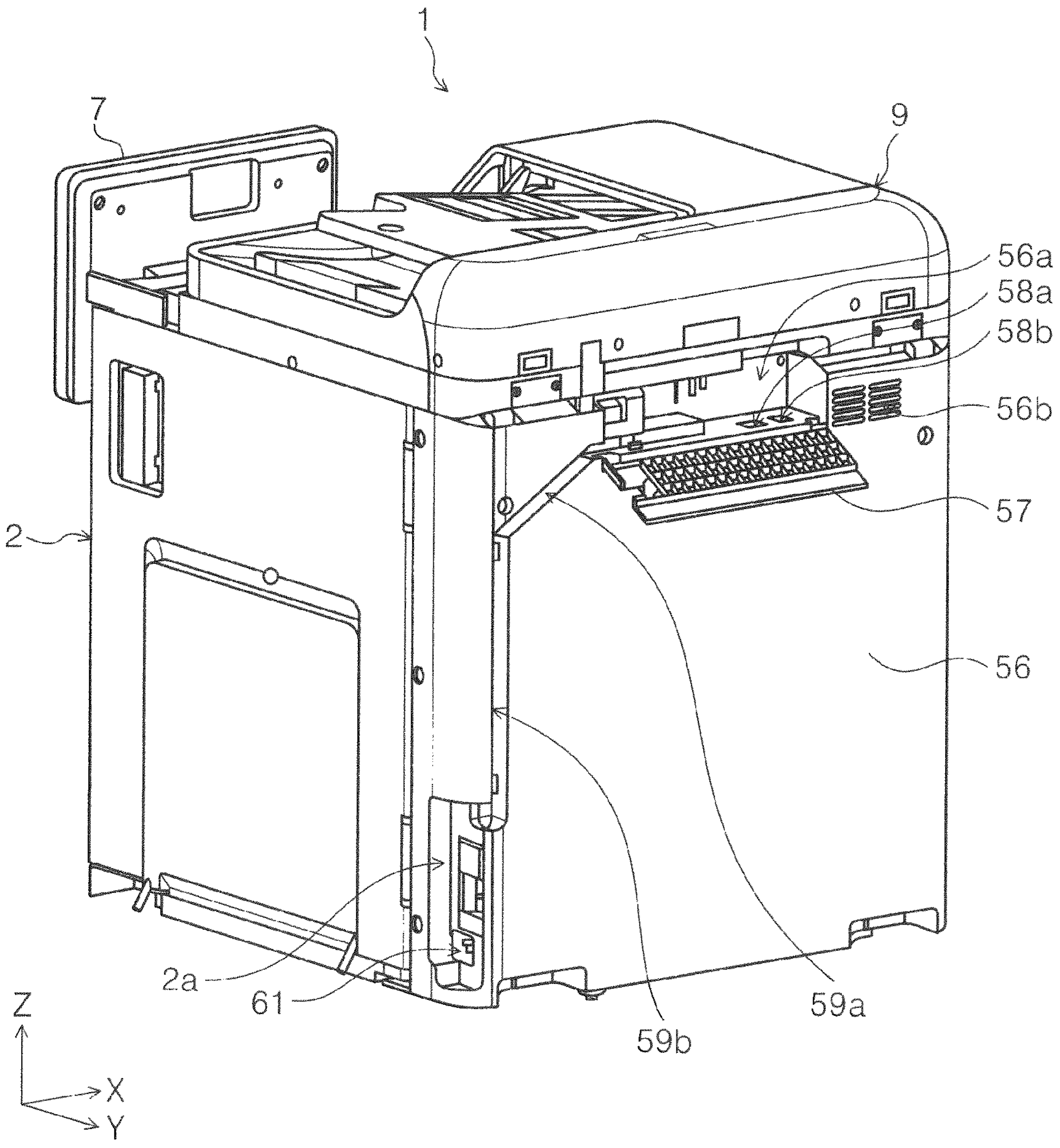
FIG. 4 is a perspective view illustrating a state in which a coupling portion cover is opened from the state of FIG. 3.

An air outlet 56*b* is formed in an upper portion of the back cover 56 and discharges heat of a power unit 80 described later. In addition, in an upper portion of the back cover 56, a coupling portion cover 57 is provided so as to be opened or closed. When the coupling portion cover 57 is opened, a connector coupling portions 58*a* and 58*b* are exposed as illustrated in FIG. 4. The connector coupling portions 58*a* and 58*b* are coupling portions complying with a standard such as a universal serial bus (USB) for coupling a communication cable (not illustrated) used for communicating with an external device.

The connector coupling portions 58*a* and 58*b* are provided in a recess 56*a* formed in an upper portion of the back cover 56. The recess 56*a* is continued to a recess 59*a* in the −X direction. In addition, the recess 59*a* is continued to a recess 59*b* in the −X direction. The recess 59*b* is formed so as to extend in the Z-axis direction, on the side of the back cover 56 in the −X direction, and the recess 59*a* extends, obliquely upward, from the upper end of the recess 59*b* and is formed to be coupled to the recess 56*a*.

Next, the lower end of the recess 59*b* is continued to a recess 2*a* formed in a side lower portion in the −X direction of the apparatus main body 2. An inlet 61 is provided in the recess 2*a* and a power cable (not illustrated) is to be coupled. With the above-described configuration, without allowing the communication cable (not illustrated), which is to be coupled to the connector coupling portions 58*a* and 58*b*, to stick out toward the back from the back cover 56, the communication cable can be coupled to the connector coupling portions 58*a* and 58*b* through the recess 2*a*, the recess 59*b*, and the recess 59*a*, and the appearance of the apparatus when the cables are arranged can be improved. In addition, since, in this state, the coupling portion cover 57 can be closed, this feature can also improve the appearance of the apparatus. In addition, the coupling portion cover 57 does not have to be kept open, the installation space of the apparatus can also be reduced. Moreover, since the communication cable (not illustrated) to be coupled to the connector coupling portions 58*a* and 58*b* and the power cable to be coupled to the inlet 61 extend from the same position of the apparatus main body 2, cable arrangement improves.

Figure 5:
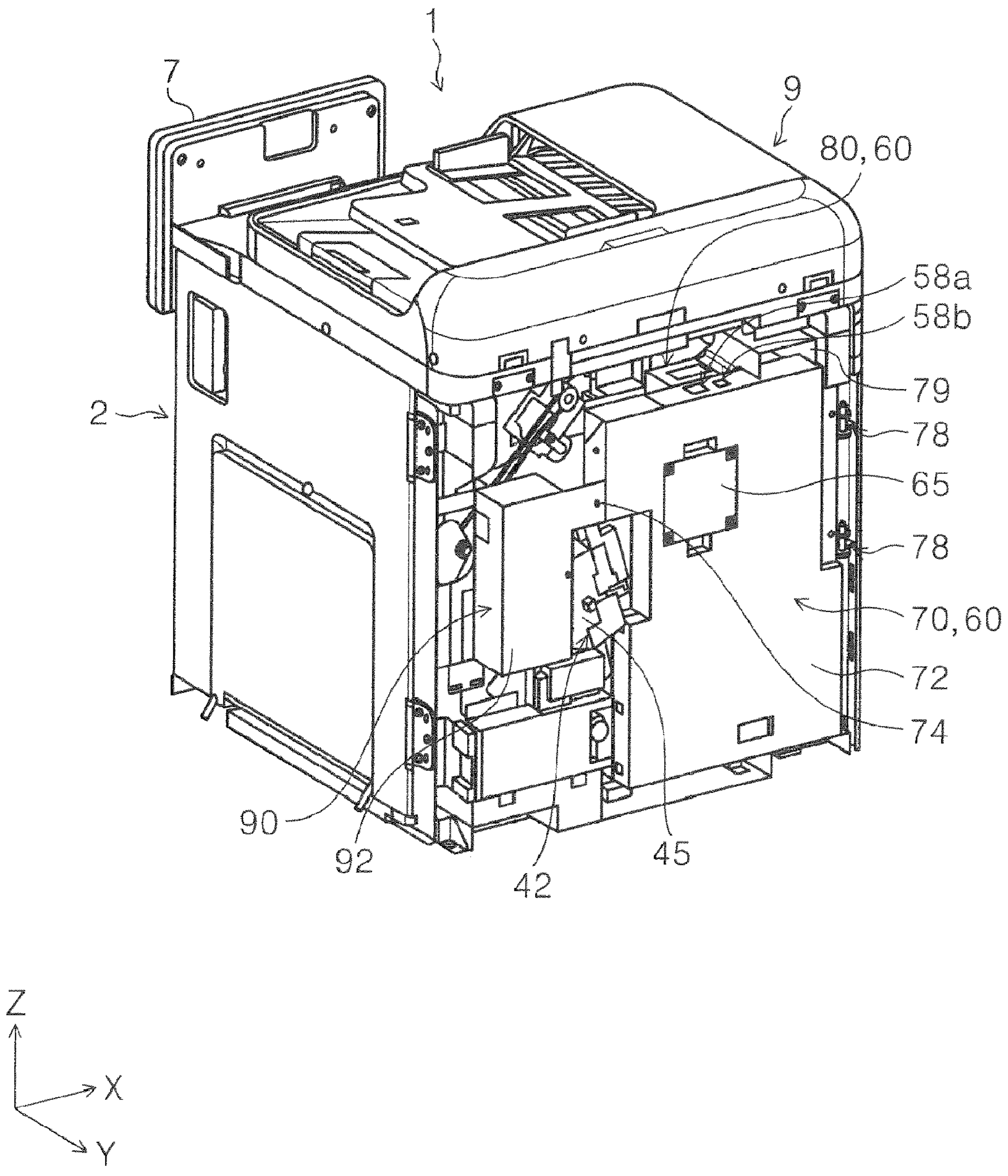
FIG. 5 is a perspective view illustrating a state in which a back cover is removed from the state of FIG. 3.

Subsequently, FIG. 5 illustrates a state in which the back cover 56 is removed. Note that in the present embodiment, the back cover 56 is configured to be completely removed from the apparatus main body 2, but the back cover 56 may be provided so as to be rotatable with respect to the apparatus main body 2 and configured to be opened or closed by rotating. The center of the rotation axis in this case may be parallel to the Z-axis direction or parallel to the X-axis direction. As illustrated in FIG. 5, when the back cover 56 is removed, the electric portion 60, which is a portion related to controlling the apparatus, is exposed. In addition, in the present embodiment, when the back cover 56 is removed, the wiping mechanism 42 and the high voltage unit 90 are exposed.

In the present embodiment, the electric portion 60 includes a control unit 70 and the power unit 80, which is a unit located in the −Y direction from the control unit 70, that is, on the apparatus front side. Note that the control unit 70 and the power unit 80 are an example of the first unit and the second unit, respectively. The outside of the control unit 70 is configured with a control unit housing 72, and a main substrate 71A and a driving substrate 71B inside are included inside the control unit housing 72 (see FIG. 13). The main substrate 71A and the driving substrate 71B are an example of the first circuit substrate. In addition, the main substrate 71A and the driving substrate 71B are an example of the control substrate. The main substrate 71A and the driving substrate 71B are disposed such that the substrate surfaces are parallel to the X-Z plane, as a result of which the substrate surfaces are orthogonal to the Y-axis direction.

The main substrate 71A includes a microcontroller and memory (not illustrated) and controls the entire printer 1. The driving substrate 71B includes a driver circuit that drives each motor, and the like, and is electrically coupled to the main substrate 71A by a coupling unit (not illustrated). Moreover, the control unit 70 includes an image processing substrate 65 on the +Y direction side. The image processing substrate 65 is a substrate including an integrated circuit for image processing and is provided so as to be exposed on a surface of the control unit housing 72 in the +Y direction. The image processing substrate 65 is coupled to the main substrate 71A by a cable (not illustrated) in the control unit 70.

Figure 11:
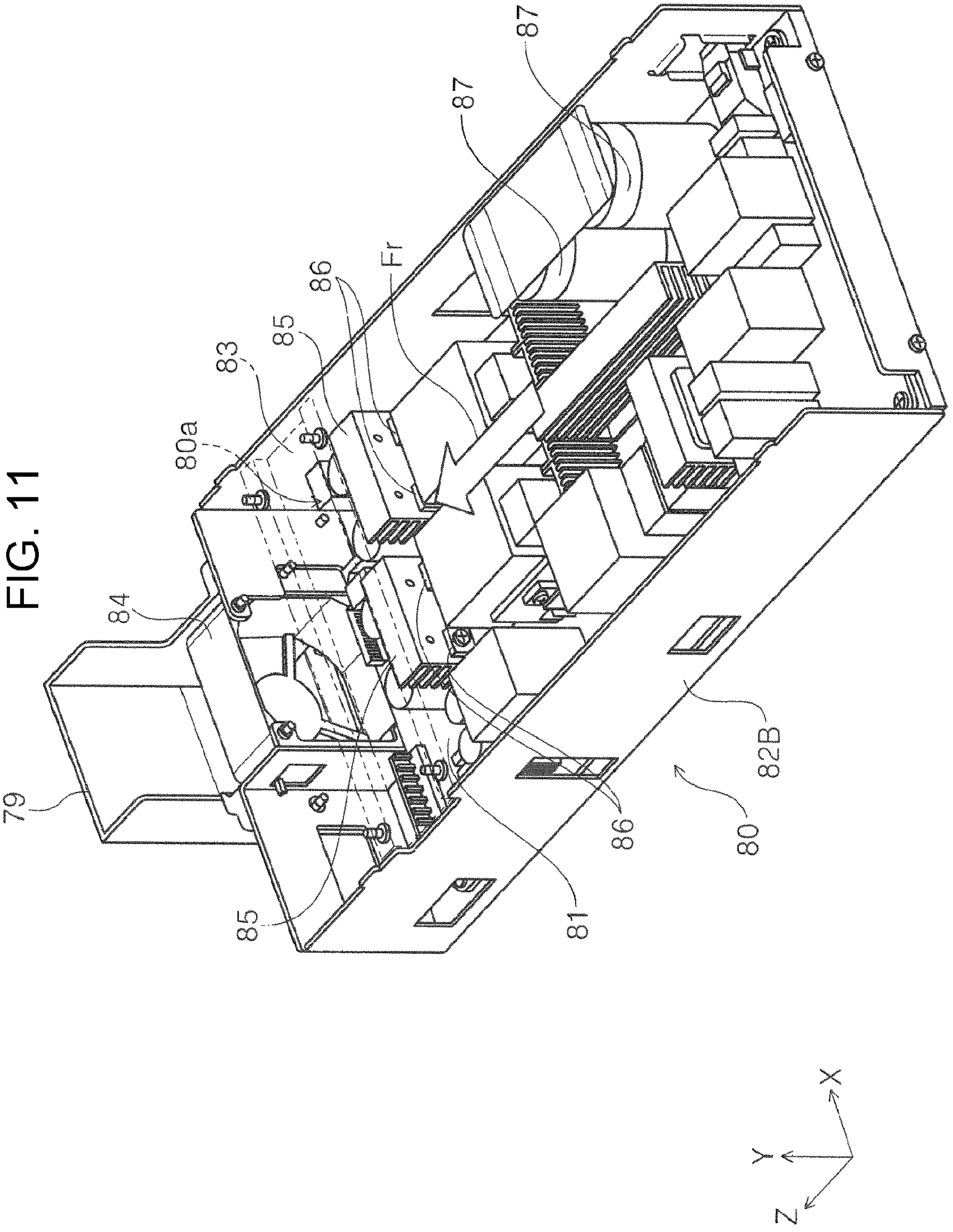
FIG. 11 is a perspective view illustrating a configuration inside the control unit.

The outside of the power unit 80 is configured with a first housing 82A and a second housing 82B (see FIG. 11). The first housing 82A and the second housing 82B each form a tray shape. By overlapping each other, the first housing 82A and the second housing 82B constitute a box-shaped housing as a whole. Moreover, the inside of the first housing 82A and the second housing 82B is provided with a power substrate 81. The power substrate 81 is located in the −Y direction from the main substrate 71A and the driving substrate 71B, that is, at a position of the apparatus inner side and is an example of the second circuit substrate provided while being oriented along surfaces of the main substrate 71A and the driving substrate 71B. This means that the power substrate 81 is, similarly to the main substrate 71A and the driving substrate 71B, disposed such that the substrate surface is parallel to the X-Z plane, and the substrate surface is orthogonal to the Y-axis direction.

The power substrate 81 includes an electronic component that adjusts a voltage of the power supplied to each constituent of the printer 1 as illustrated in FIG. 11. In FIG. 11, an electronic component 86 is provided on the power substrate 81. The electronic component 86 is provided with a heat sink 85, and the heat sink 85 promotes dissipation of heat generated by the electronic component 86.

Figure 9:
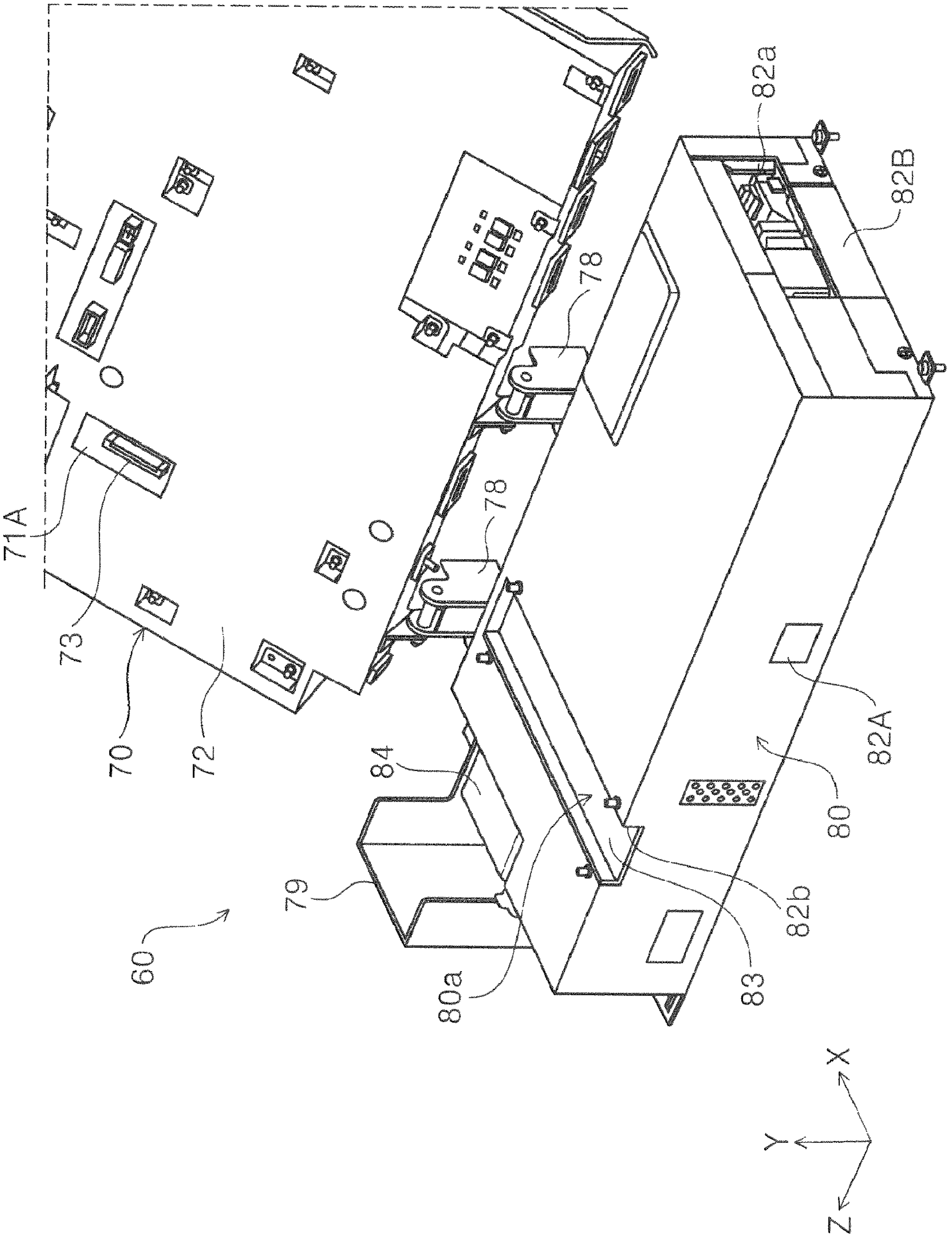
FIG. 9 is a perspective view of a power unit and the control unit in a state in which the control unit is opened with respect to the power unit.

As illustrated in FIG. 11, an exhaust fan 84 is provided on the power substrate 81, and the exhaust fan 84 forms an airflow indicated by arrow Fr in the power unit 80. As a result, heat in the power unit 80 is guided to the air outlet 56*b* (see FIG. 4) through an exhaust duct 79 and is discharged to the outside of the apparatus from the air outlet 56*b*. The exhaust duct 79 extends from the power unit 80 to a lateral side of the apparatus main body 2, that is, the back side via the +Z direction side of the control unit 70. At the end of the power unit 80 in the −Z direction, an opening 82*a* is formed by the first housing 82A and the second housing 82B as illustrated in FIG. 9, and the outside air is taken into the power unit 80 from the opening 82*a*.

Figure 6:
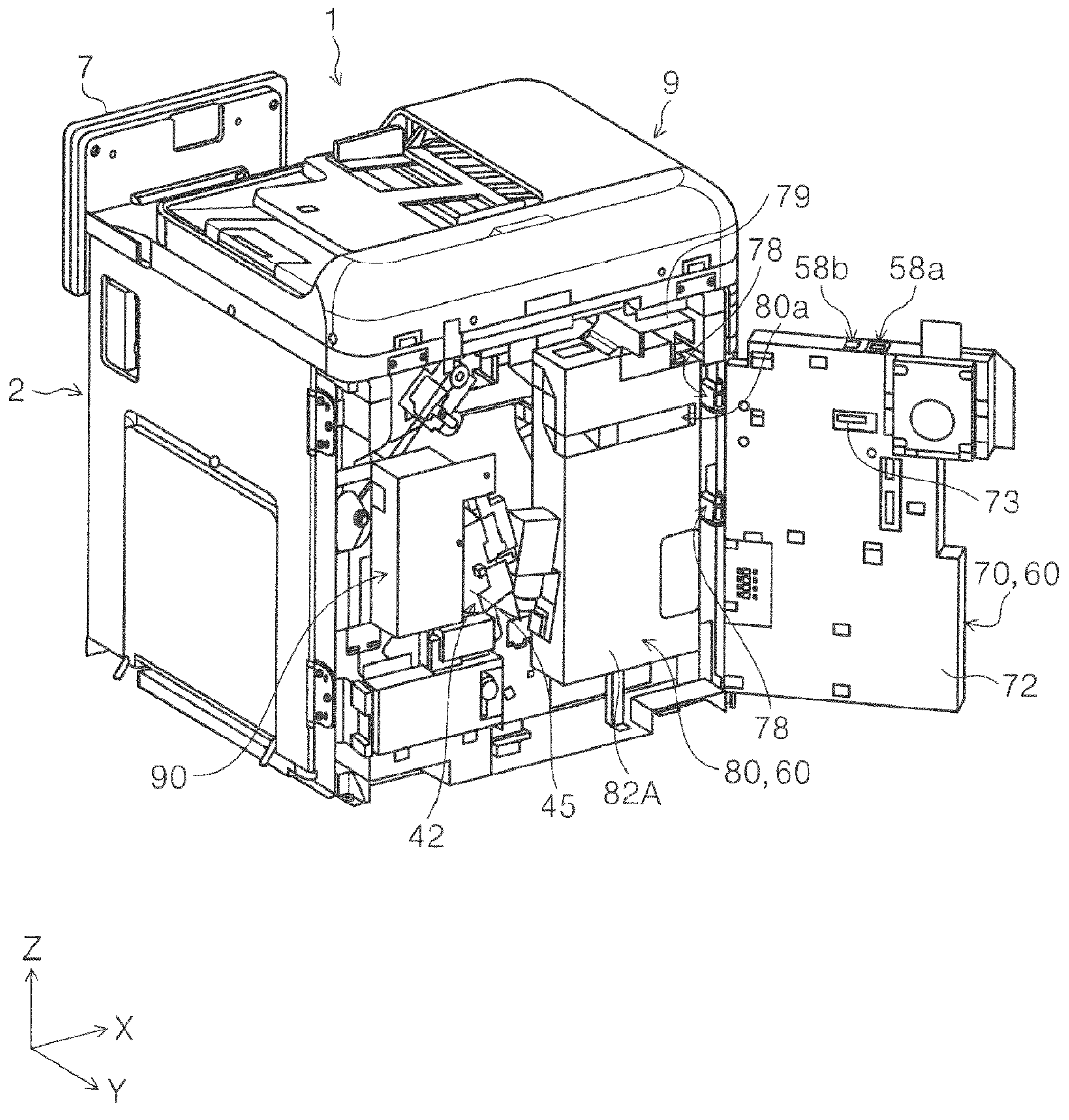
FIG. 6 is a perspective view illustrating a state in which a control unit is opened from the state of FIG. 5

Next, returning to FIG. 5, the control unit 70 is provided so as to be rotatable with respect to the apparatus main body 2 via a hinge portion 78 and is opened and closed by rotating. In the present embodiment, two hinge portions 78 are provided at an end of the apparatus back side in the +X direction at an interval in the Z-axis direction. The center of the rotation axis of the control unit 70 by the hinge portions 78 is parallel to the Z-axis direction. Accordingly, when the control unit 70 opens from a closed state, as illustrated by the change from FIG. 5 to FIG. 6, the control unit 70 opens to the right when viewed from a user at a position facing the apparatus back side. Note that the center of the rotation axis of the control unit 70 is not limited to being parallel to the Z-axis direction, and, for example, may be parallel to the X-axis direction. In addition, instead of providing the control unit 70 so as to be opened or closed with respect to the apparatus main body 2, the control unit 70 may be provided so as to be attached to or removed from the apparatus main body 2.

In addition, in the present embodiment, the control unit housing 72 constituting the outer shell of the control unit 70 and a high voltage unit housing 92 constituting the outer shell of the high voltage unit 90 are coupled to each other by a screw 74. By removing the screw 74, the control unit 70 can be opened.

The power unit 80 is fixed to the apparatus main body 2 by a screw (not illustrated). By removing the screw, the power unit 80 can be removed from the apparatus main body 2. However, similarly to the control unit 70, the power unit 80 may be provided so as to be rotatable with respect to the apparatus main body 2. In this case, the center of the rotation axis may be, similarly to the control unit 70, parallel to the Z-axis direction, or may be parallel to the X-axis direction.

In a state where the control unit 70 is closed, between the control unit 70 and the high voltage unit 90, a part of the coupling unit 45 constituting the wiping mechanism 42 is exposed. When the control unit 70 is opened from this state, and the high voltage unit 90 is further removed, as illustrated in FIG. 7, the wiping mechanism 42 is largely exposed. Note that in the present embodiment, the high voltage unit 90 is attached to the apparatus main body 2 by a screw (not illustrated), but similarly to the control unit 70, the high voltage unit 90 may be provided so as to be rotatable with respect to the apparatus main body 2. In this case, similarly to the control unit 70, the center of the rotation axis may be parallel to the Z-axis direction, or may be parallel to the X-axis direction. When the high voltage unit 90 is provided so as to be rotatable with respect to the apparatus main body 2, it is considered that the center of the rotation axis is parallel to the Z-axis direction and the high voltage unit 90 opens to the left when viewed from a user at a position facing the apparatus back side.

Figure 8:
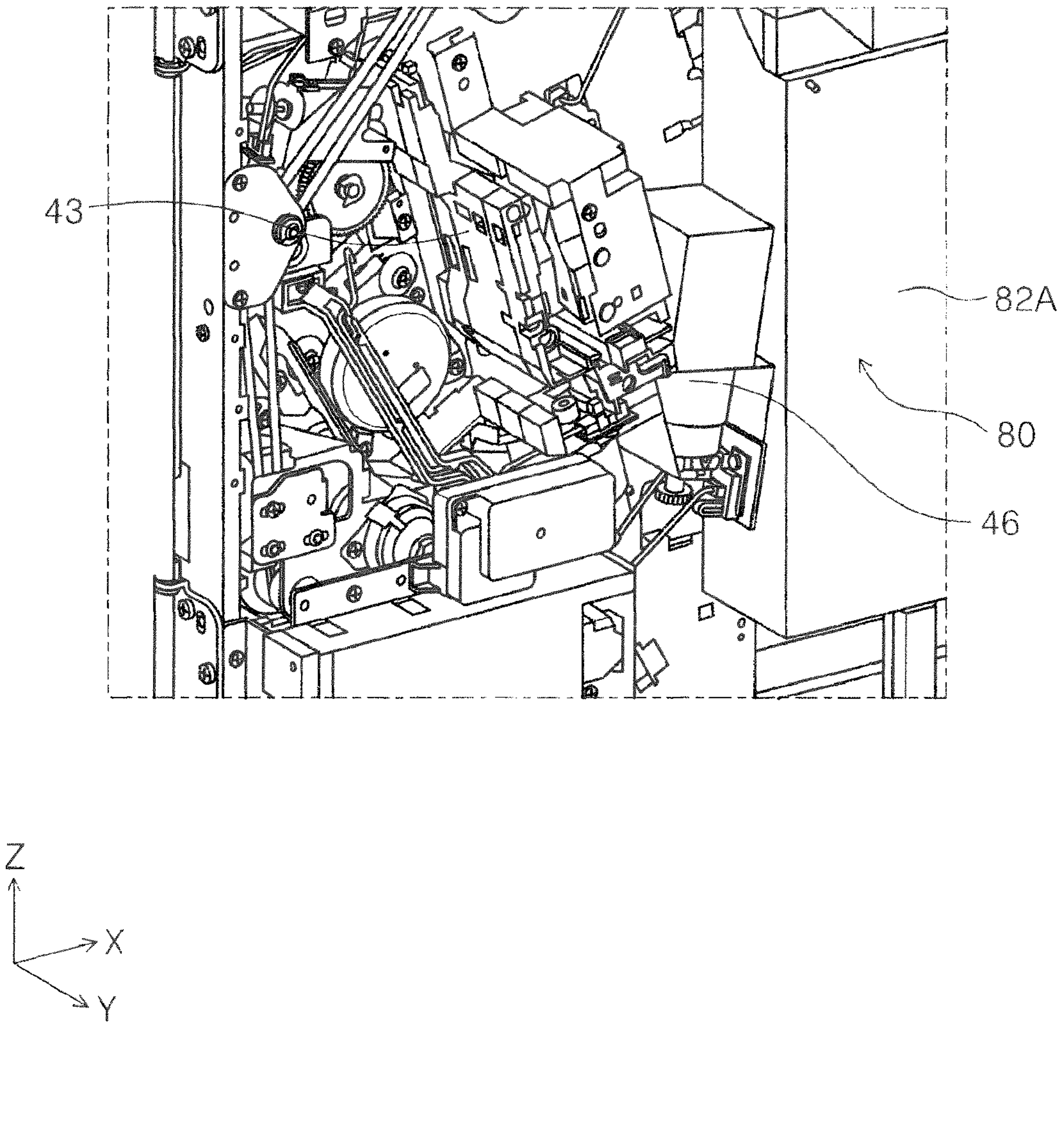
FIG. 8 is a perspective view illustrating a state in which a coupling unit is removed from the state illustrated in FIG. 7.

The coupling unit 45 constituting the wiping mechanism 42 can be removed as illustrated by the change from FIG. 7 to FIG. 8 by removing two screws 47 illustrated in FIG. 7. By removing the coupling unit 45, the wiper portion 43 including the wiper 44 (see FIG. 2) can be largely exposed, and the wiper portion 43 can be removed. Moreover, by removing the wiper portion 43, the wiper 44 can be replaced.

Figure 10:
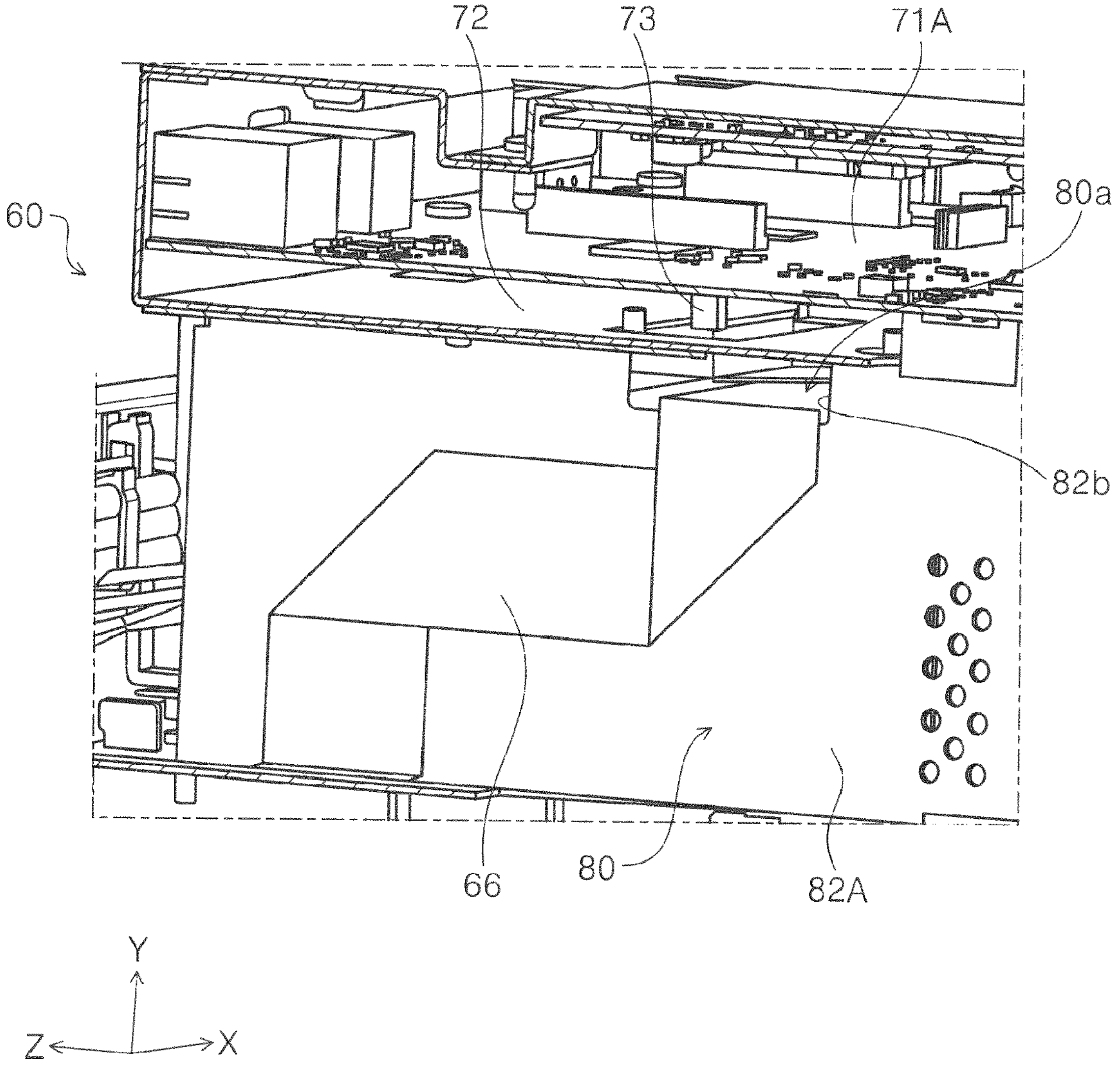
FIG. 10 is a perspective view illustrating a positional relation between a recess of the power unit and a coupling connector of the control unit.

Next, a configuration for reducing the space between the control unit 70 and the power unit 80 in the Y-axis direction will be described with reference to FIG. 9 and the subsequent figures. The power unit 80 is disposed so as to face the control unit 70 in the Y-axis direction. Here, when attempt was made to electrically couple the power unit 80 and the control unit 70, a space between the units required for providing an electrically coupling portion such as a connector would increase, as a result of which the size of the apparatus would tend to increase in the Y-axis direction. Specifically, in FIG. 9, a coupling connector 73 is provided on the main substrate 71A, and a flexible flat cable (hereinafter, referred to as FFC) 66 that extends from the power unit 80 is coupled to the coupling connector 73 as illustrated in FIG. 10. In consideration of coupling of the FFC 66 to the coupling connector 73, a space needs to be reserved between the control unit 70 and the power unit 80 in the Y-axis direction. In view of such a problem, in the present embodiment, the power unit 80 includes a recess 80*a* at a position facing the coupling connector 73 on a surface facing the control unit 70.

As a result, in a configuration in which the control unit 70 and the power unit 80 are disposed so as to face each other, a space required for arranging the FFC 66 after the FFC 66 is coupled to the coupling connector 73, that is, a space between the control unit 70 and the power unit 80 can be reduced, and the size of the apparatus can be suppressed from increasing in the Y-axis direction. Note that in the present embodiment, the recess 80*a* may be formed by providing a recess cover 83 in a cut-away section 82*b* formed in the first housing 82A. However, the present disclosure is not limited to having this configuration, and the recess 80*a* may be directly formed in the first housing 82A. In addition, the recess cover 83 may be omitted depending on the circumstances.

In addition, in the present embodiment, the recess 80*a* is provided and extends in the X-axis direction, which is a direction intersecting the overlapping direction (Y-axis direction) of the control unit 70 and the power unit 80. As a result, the FFC 66 can be arranged in the recess 80*a*, a space for arranging the FFC 66 between the control unit 70 and the power unit 80 becomes unnecessary, and the size of the apparatus can be reduced.

Figure 14:
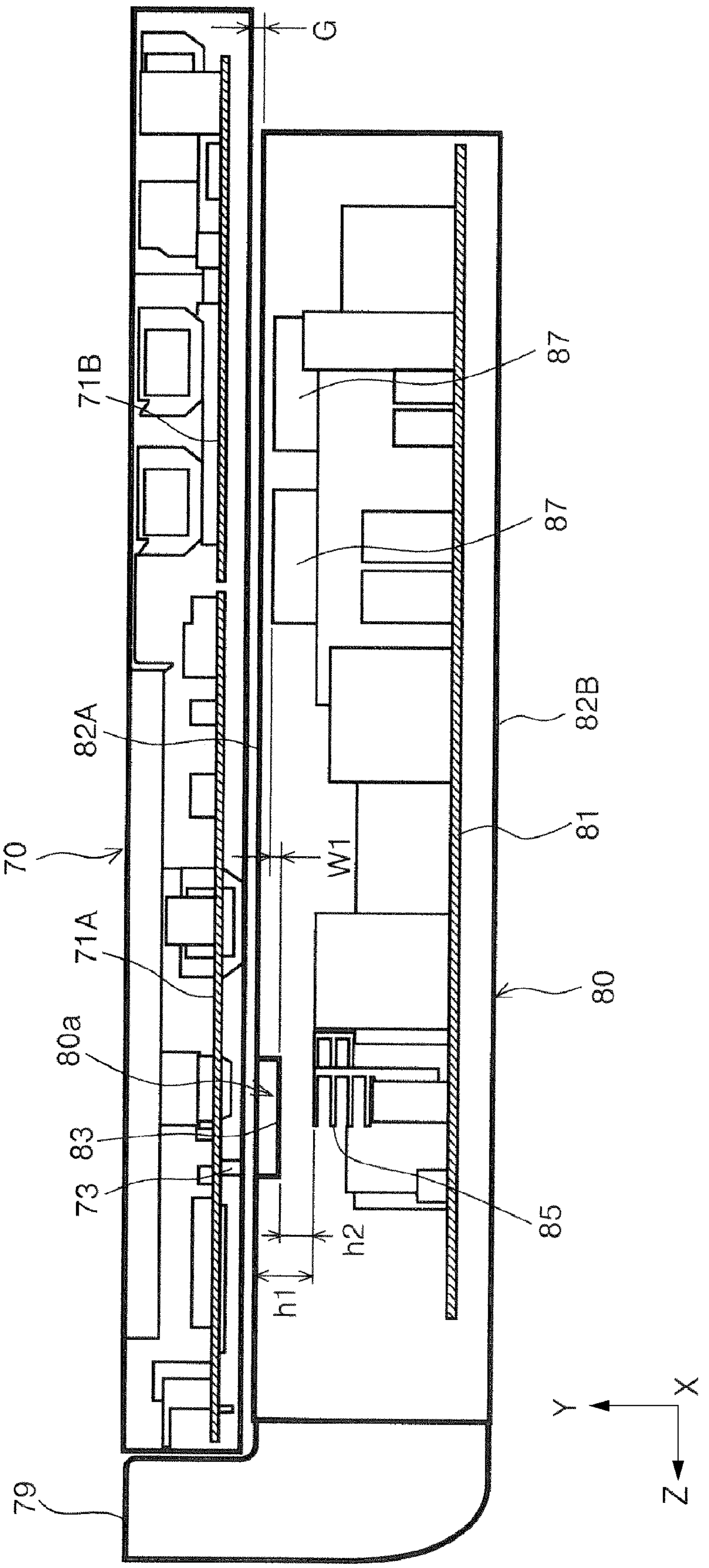
FIG. 14 is a cross sectional view of the power unit and the control unit cut along a Y-Z plane.

In addition, in the overlapping direction (Y-direction) of the control unit 70 and the power unit 80, as illustrated in FIG. 14, a part of the recess 80*a* overlaps a part of an electronic component 87 included in the power substrate 81. The electronic component 87 is a component that most significantly projects in the +Y direction among the components provided on the power substrate 81, and the thickness of the power unit 80 in the Y-axis direction depends on the dimension of the electronic component 87. In such a configuration, a range W1 in the Y-axis direction indicates the range where the recess 80*a* overlaps the electronic component 87 in the Y-axis direction.

Note that since a part of the recess 80*a* overlaps a part of the electronic component 87 in the Y-axis direction, it can be said that the position of a part of the recess 80*a* and the position of a part of the electronic component 87 are the same in the Y-axis direction. Alternatively, since a part of the recess 80*a* overlaps a part of the electronic component 87 in the Y-axis direction, it can be said that, when viewed in the Z-axis direction, which is a direction intersecting the Y-axis direction, a part of the recess 80*a* appears to overlap a part of the electronic component 87. In this manner, since a part of the recess 80*a* overlaps a part of the electronic component 87 in the Y-axis direction, the dimension of the power unit 80 in the Y-axis direction can be suppressed, and in addition, the apparatus dimension in the Y-axis direction can be suppressed.

Moreover, as described with reference to FIG. 11, the power unit 80 includes the exhaust fan 84 that generates an airflow inside the unit. In addition, as illustrated in FIG. 14, the power substrate 81 includes the heat sink 85 at a position facing the back side of the recess 80*a*. This means that, in a portion, in the power unit 80, where the recess 80*a* is provided, the space in the Y-axis direction is reduced, the airflow generated inside the unit by the exhaust fan 84 (arrow Fr in FIG. 11) is faster than airflows in other portions. In FIG. 14, a dimension h1 is the distance between the back side of the first housing 82A and the heat sink 85, a dimension h2 is the distance between the back side of the recess 80*a* (the recess cover 83) and the heat sink 85, and a relation of $h2<h1$ is satisfied. With such a configuration, the flow velocity of the airflow generated in a portion of the heat sink 85 is increased compared with those in other portions, as a result of which the heat dissipation efficiency of the heat sink 85 can be improved. Note that in place of the heat sink 85, another heat generating component may be disposed. Alternatively, both another heat generating component and the heat sink 85 may be disposed at a position facing the back side of the recess 80*a*.

Figure 12:
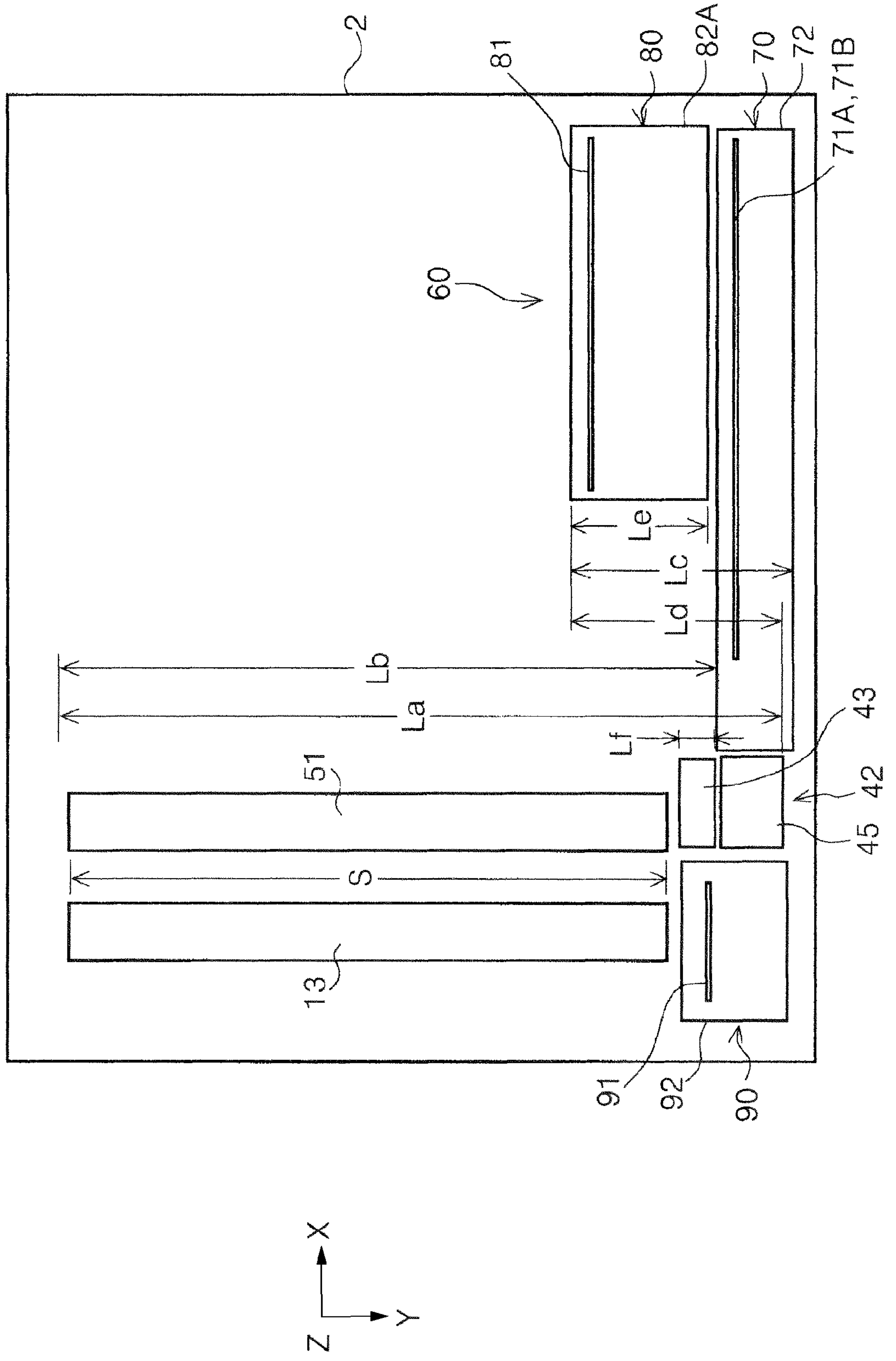
FIG. 12 is a schematic diagram of a positional relation of an electric portion and the wiping mechanism when viewed from above an apparatus.

Next, a positional relation between the electric portion 60 including the control unit 70 and the power unit 80, and the wiping mechanism 42 will be described. As described above, the wiping mechanism 42 includes the wiper portion 43 that wipes the ink discharging surface 51*a* of the line head 51 by moving in the Y-axis direction and the coupling unit 45 that is provided in a fixed manner. The Y-axis direction is a direction intersecting substrate surfaces of the main substrate 71A, the driving substrate 71B, and the power substrate 81. In addition, as illustrated in FIG. 12, at least a part of the electric portion 60 overlaps a part of the wiping mechanism 42 in the Y-axis direction. As a result, the apparatus dimension in the Y-axis direction, that is, the apparatus depth direction can be suppressed.

More specifically, a range La illustrated in FIG. 12 indicates a range occupied by the wiping mechanism 42 in the Y-axis direction. The range La includes a range (range Lb) occupied by the wiper portion 43 with the movement of the wiper portion 43. In other words, the range Lb corresponds to a moving area of the wiper portion 43. In addition, a range Lc indicates a range occupied by the electric portion 60 in the Y-axis direction. As illustrated, a part of the range La includes a part of the range Lc. This means that the wiping mechanism 42 overlaps the electric portion 60 in the Y-axis direction. The overlapping range is indicated by a range Ld. In this manner, at least a part of the electric portion 60 overlaps a part of the wiping mechanism 42 in the Y-axis direction. Note that the aspect in which at least a part of the electric portion 60 overlaps a part of the wiping mechanism 42 in the Y-axis direction includes, similarly to the present embodiment, an aspect in which a part of the electric portion 60 overlaps a part of the wiping mechanism 42 in the Y-axis direction and an aspect in which all of the electric portion 60 overlaps a part of the wiping mechanism 42 in the Y-axis direction.

Note that since at least a part of the electric portion 60 overlaps a part of the wiping mechanism 42 in the Y-axis direction, it can be said that the position of at least a part of the electric portion 60 and the position of a part of the wiping mechanism 42 are the same.

Alternatively, since at least a part of the electric portion 60 overlaps a part of the wiping mechanism 42 in the Y-axis direction, it can be said that, when viewed in the X-axis direction, which is a direction intersecting the Y-axis direction, at least a part of the electric portion 60 appears to overlap a part of the wiping mechanism 42. Note that in the present embodiment, when viewed in the X-axis direction, which is a direction intersecting the Y-axis direction, at least a part of the electric portion 60 appears to overlap a part of the wiping mechanism 42, but when viewed in the Z-axis direction, which is a direction intersecting the Y-axis direction, at least a part of the electric portion 60 may appear to overlap a part of the wiping mechanism 42.

Note that in the present embodiment, a part of the electric portion 60 overlaps all of the coupling unit 45 in the Y-axis direction. Specifically, a part of the control unit 70 overlaps all of the coupling unit 45 in the Y-axis direction. Note that at least a part of the control unit 70 may overlap at least a part of the coupling unit 45 in the Y-axis direction. This means that a part of the control unit 70 may overlap a part of the coupling unit 45 in the Y-axis direction.

Note that in the present embodiment, all of the main substrate 71A and the driving substrate 71B overlap a part of the coupling unit 45 in the Y-axis direction. Note that at least a part of the main substrate 71A may overlap at least a part of the coupling unit 45 in the Y-axis direction. This means that a part of the main substrate 71A may overlap a part of the coupling unit 45 in the Y-axis direction. Similarly, at least a part of the driving substrate 71B may overlap at least a part of the coupling unit 45 in the Y-axis direction. This means that a part of the driving substrate 71B may overlap a part of the coupling unit 45 in the Y-axis direction.

Note that in the present embodiment, a part of the moving is of the wiper portion 43 overlaps at least a part of the power unit 80 in the Y-axis direction. Specifically, in the present embodiment, the range Lb occupied by the wiper portion 43 with its movement in the Y-axis direction includes all of a range Le occupied by the power unit 80 in the Y-axis direction. However, the range Lb may include a part of the range Le. This means that a part of the moving area of the wiper portion 43 may overlap a part of the power substrate 81 of the power unit 80 in the Y-axis direction. Note that in the present embodiment, a part of the moving area of the wiper portion 43 overlaps all of the power substrate 81 of the power unit 80 in the Y-axis direction. Note that a part of the moving area of the wiper portion 43 may overlap a part of the power substrate 81 of the power unit 80 in the Y-axis direction.

In addition, the wiper portion 43 sets an end in the +Y direction in the moving area in the Y-axis direction, that is, a position where the wiper portion 43 is coupled to the coupling unit 45 to be a home position. The wiper portion 43 is stopped at the home position when not wiping. In addition, a range occupied by the line head 51 in the Y-axis direction is the area of the ink discharging surface 51*a* wiped by the wiper portion 43. A wiping area S is indicated in FIG. 12. The wiper portion 43 moves between the home position where the wiper portion 43 is coupled to the coupling unit 45 and the above-described wiping area. Note that the home position may be set to a position where the wiper portion 43 retreats from the wiping area and waits. When the wiper portion 43 is located at the home position, at least a part of the electric portion 60 overlaps at least a part of the wiper portion 43. A range Lf is a range where the wiper portion 43 located at the home position overlaps the electric portion 60 in the Y-axis direction. In the present embodiment, all of the wiper portion 43 overlaps a part of the electric portion 60 in the Y-axis direction, but a part of the wiper portion 43 may overlap a part of the electric portion 60 in the Y-axis direction. Alternatively, all of the electric portion 60 may overlap a part of the wiper portion 43 in the Y-axis direction.

Note that in the present embodiment, when the wiper portion 43 is located at the home position, a part of the wiper portion 43 overlaps a part of the power unit 80 in the Y-axis direction. Note that when the wiper portion 43 is located at the home position, at least a part of the wiper portion 43 may overlap at least a part of the power unit 80 in the Y-axis direction. This means that all of the wiper portion 43 may overlap a part or all of the power unit 80 in the Y-axis direction. In addition, when the wiper portion 43 is located at the home position, at least a part of the wiper portion 43 may overlap at least a part of the control unit 70 in the Y-axis direction. This means that a part or all of the wiper portion 43 may overlap a part or all of the control unit 70 in the Y-axis direction.

In addition, in the present embodiment, the Y-axis direction, which is the moving direction of the wiper portion 43, is the apparatus depth direction, and in such a configuration, at least a part of the electric portion 60 overlaps at least a part of the wiping mechanism 42 in the Y-axis direction, as a result of which the apparatus dimension in the apparatus depth direction is suppressed. However, while the main substrate 71A, the driving substrate 71B, and the power substrate 81 are oriented along the Y-Z plane, and are disposed along a side in the +X direction in the apparatus main body 2, or are disposed along a side in the −X direction, the moving direction of the wiper portion 43 may be set in a direction extending in the X-axis direction. In this case, the X-axis direction dimension of the apparatus, that is, the width direction can be suppressed.

In addition, in the present embodiment, the electric portion 60 is located in the back side direction, in the Y-axis direction, that is, the apparatus depth direction. Since the electric portion 60 is located in the back side direction, in the apparatus depth direction, the electric portion 60 is located in the +Y direction from the central position of the apparatus main body 2 in the apparatus depth direction. In addition, the main substrate 71A, the driving substrate 71B, and the power substrate 81 are provided at an interval in the Y-axis direction, the power substrate 81 is provided in the power unit 80 constituting the electric portion 60, and the main substrate 71A and the driving substrate 71B, which are control substrates, are provided in the control unit 70 constituting the electric portion 60 and located on the apparatus back side with respect to the power unit 80. Note that in the present embodiment, the outside of the control unit 70 is configured with the control unit housing 72, but the control unit housing 72 may not be included. This means that the control unit 70 may be configured with the main substrate 71A and the driving substrate 71B. Note that in the present embodiment, the control unit 70 is located on the apparatus back side with respect to the power unit 80, but in place of this configuration, the power unit 80 may be located in the apparatus back side with respect to the control unit 70. In addition, in the present embodiment, the electric portion 60 includes the control unit 70 and the power unit 80, but the electric portion 60 may include either one of the control unit 70 and the power unit 80. Alternatively, the electric portion 60 may include a unit having a function different from a function of the control unit 70 or the power unit 80.

In addition, in the present embodiment, the back cover 56 that forms the back side of the apparatus is provided so as to be attached or removed, and by removing the back cover 56, the wiping mechanism 42 and the control unit 70 are exposed. With such a configuration, maintenance performance of the wiping mechanism 42 and the control unit 70, that is, the electric portion 60, improves.

In addition, the power unit 80 is provided so as to be attached or removed, and the control unit 70 is provided so as to be opened or closed, as the control unit 70 opens from a closed state, the power unit 80 is exposed and is configured to be attached or removed. Accordingly, a storage space for the control unit 70 becomes unnecessary when the power unit 80 is attached or removed, and workability when the power unit 80 is attached or removed improves.

In addition, the high voltage unit 90 includes a high voltage substrate 91. The high voltage substrate 91 handles a higher voltage than those of the power substrate 81, the main substrate 71A, and the driving substrate 71B. The high voltage substrate 91 is provided outside the electric portion 60 and in the −X direction intersecting the Y-axis direction with respect with the electric portion 60. With such a configuration, noise generated from the high voltage substrate 91 can be suppressed from adversely affecting the electric portion 60.

Figure 13:
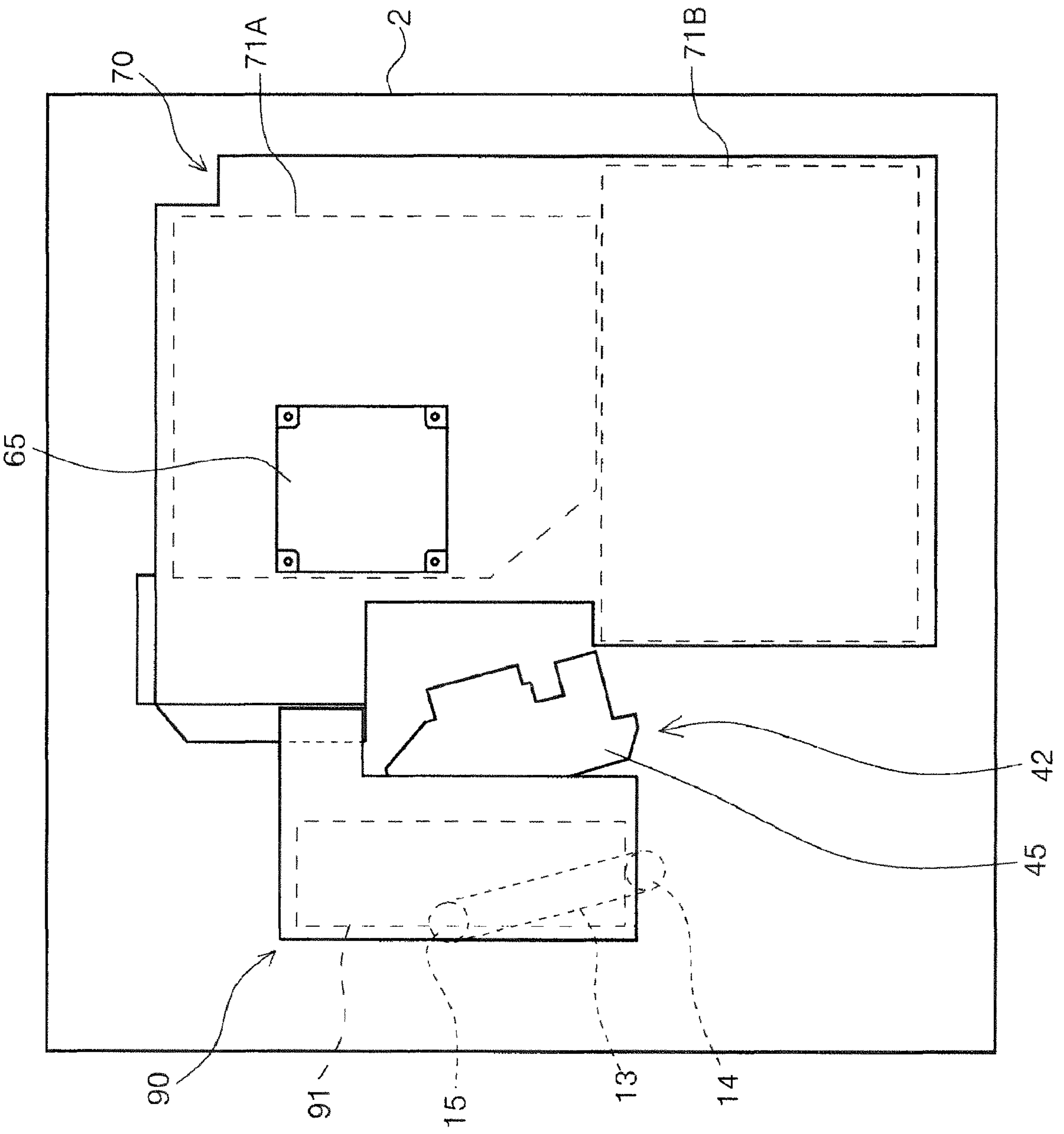
FIG. 13 is a diagram illustrating a positional relation of the electric portion, the high voltage unit, and a transportation belt when viewed from back of the apparatus.
Figure 13:
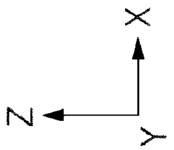

In addition, the high voltage substrate 91 is a substrate that controls an electrical charge of the transportation belt 13, and the high voltage substrate 91 is located on a lateral side of the transportation belt 13, specifically, in the +Y direction with respect to the transportation belt 13. The positional relation between the high voltage substrate 91 and the transportation belt 13 is a positional relation in which a part of the high voltage substrate 91 appears to overlap a part of the transportation belt 13, when viewed from the apparatus back side as illustrated in FIG. 13. Needless to say, all of the transportation belt 13 may appear to overlap the high voltage substrate 91. With such a configuration, the disposition distance between the high voltage substrate 91 and the transportation belt 13 can be reduced and, in addition, the length of wiring between the charging roller (not illustrated) electrifying the transportation belt 13 and the high voltage substrate 91 can be reduced. Note that a part of the wiping mechanism 42 may overlap a part of the high voltage unit 90 in the Y-axis direction. Specifically, a part of the coupling unit 45 may overlap a part of the high voltage unit 90, and a part of the wiper portion 43 may overlap a part of the high voltage substrate 91.

In addition, a head driving substrate 52 (see FIGS. 1 and 2) that drives the line head 51 is provided outside the electric portion 60 and above the line head 51. Accordingly, noise generated from the electric portion 60 can be suppressed from adversely affecting the head driving substrate 52.

Figure 15:
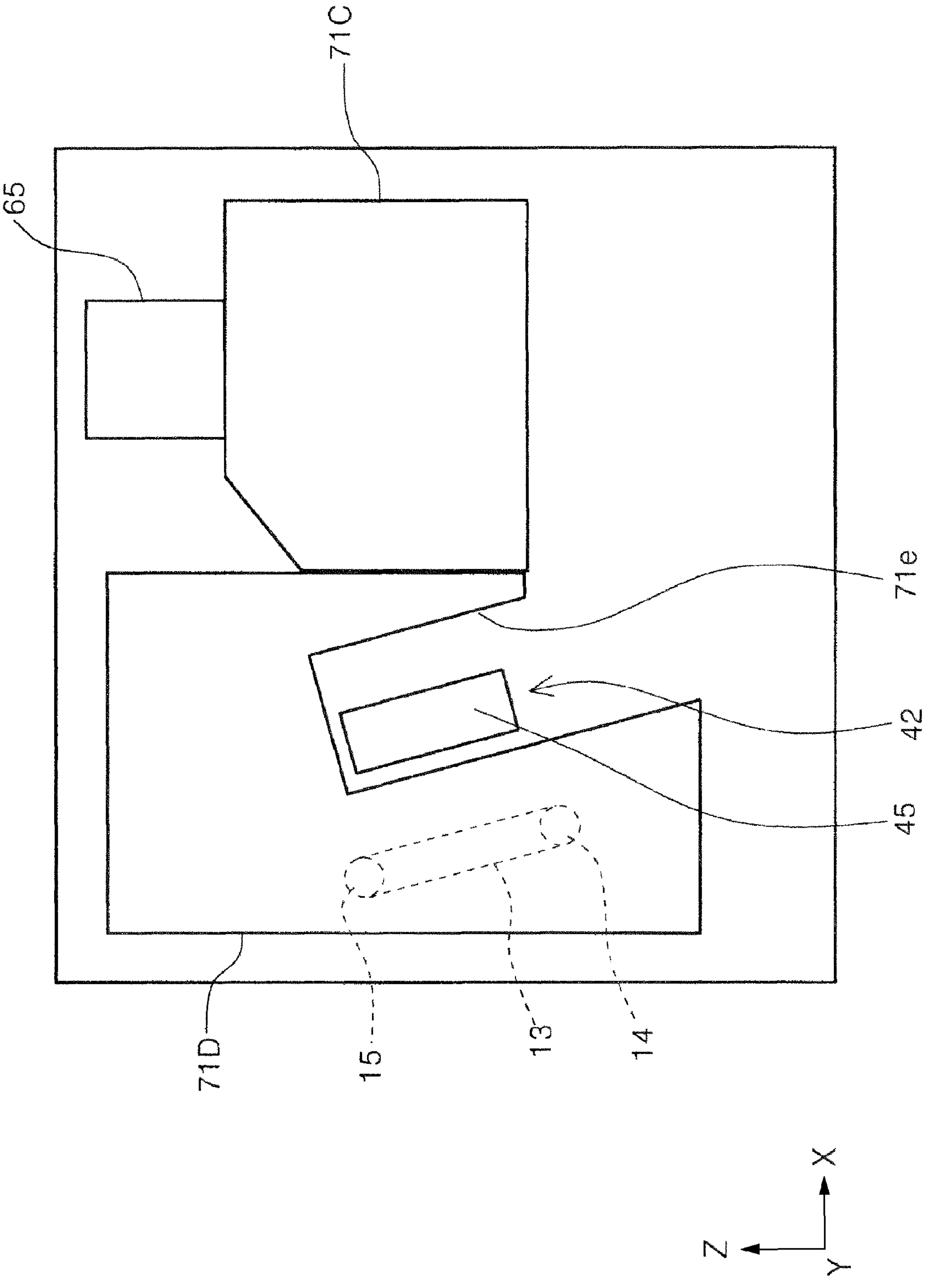
FIG. 15 is a front view of a main substrate and a driving substrate according to another embodiment.

Note that the main substrate 71A and the driving substrate 71B can also be disposed as illustrated in FIG. 15. FIG. 15 illustrates another embodiment. A main substrate 71C and a driving substrate 71D are illustrated. Similarly to the above-described embodiment, in the present embodiment, at least a part of the electric portion 60 overlaps at least a part of the wiping mechanism 42 in the Y-axis direction. In the present embodiment, the main substrate 71C and the driving substrate 71D are disposed in the X-axis direction. A cut-away section 71*e* is formed on the driving substrate 71D, and when viewed from the back side of the apparatus, the wiping mechanism 42 is disposed in the cut-away section 71*e*. In other words, it can be said that the cut-away section 71*e* is formed on the driving substrate 71D to avoid the wiping mechanism 42. As a result, the driving substrate 71D is disposed effectively using a space around the wiping mechanism 42, and the size of the apparatus can be reduced.

The present disclosure is not limited to the embodiments described above, and various modifications can be made within the scope of the disclosure described in the scope of the claims, and it is needless say that the modifications are also included in the scope of the present disclosure. For example, a recording apparatus that forms a toner image on a recording material may include a recording unit that performs recording on a medium, an apparatus main body that includes the recording unit inside, a first circuit substrate that is provided while being oriented along a side of the apparatus main body, a second circuit substrate that is located an inner side of the apparatus from the first circuit substrate and is provided while being oriented along a surface of the first circuit substrate, a first unit that includes the first circuit substrate, and a second unit that includes the second circuit substrate and is disposed to face the first unit, and the first unit includes a connector at a position facing the second unit, and the second unit includes a recess at a position facing the connector.

What is claimed is:

1. A liquid discharging apparatus comprising:

a liquid discharging head that discharges a liquid onto a medium;

a wiping mechanism that wipes a liquid discharging surface of the liquid discharging head and has a wiper portion that moves along a first direction that is along the liquid discharging surface and wipes the liquid discharging surface; and an electric portion that is a portion related to controlling the liquid discharging apparatus and includes at least one circuit substrate, wherein the first direction intersects a surface of the circuit substrate, in the first direction, at least a part of the electric portion overlaps a part of the wiping mechanism.

2. The liquid discharging apparatus according to claim 1, wherein the wiper portion is configured to move between a home position and a wiping area where the wiper portion wipes the liquid discharging surface, and when the wiper portion is located at the home position, at least a part of the electric portion overlaps at least a part of the wiper portion in the first direction.

3. The liquid discharging apparatus according to claim 2, wherein the first direction is an apparatus depth direction that is a direction from a front side of an apparatus main body to a back side of the apparatus main body.

4. The liquid discharging apparatus according to claim 3, wherein the electric portion is located at the back side in the apparatus depth direction, the at least one circuit substrate comprises a power substrate and a control substrate, the power substrate and the control substrate are provided at an interval in the apparatus depth direction, the power substrate is provided in a power unit that constitutes the electric portion, and the control substrate is provided in a control unit that constitutes the electric portion and is located at a back side of the apparatus main body with respect to the power unit.

5. The liquid discharging apparatus according to claim 4, further comprising:

a back cover that forms an apparatus back side and is configured to be attached or removed with respect to the apparatus main body, wherein when the back cover is removed, the wiping mechanism and the control unit are exposed.

6. The liquid discharging apparatus according to claim 5, wherein the power unit is configured to be attached or removed with respect to the apparatus main body, the control unit is configured to be opened or closed, and when the control unit is opened, the power unit is exposed and is configured to be attached or removed with respect to the apparatus main body.

7. The liquid discharging apparatus according to claim 1, wherein a high voltage substrate that handles a higher voltage than a voltage that the electric portion handles is provided outside the electric portion in a direction intersecting the first direction.

8. The liquid discharging apparatus according to claim 7, further comprising:

a transportation belt that transports the medium and is provided at a position facing the liquid discharging head, wherein the high voltage substrate controls an electrical charge of the transportation belt, and the high voltage substrate is located at a lateral side of the transportation belt.

9. The liquid discharging apparatus according to claim 1, wherein a head driving substrate that drives the liquid discharging head is provided above the liquid discharging head.

10. The liquid discharging apparatus according to claim 1, wherein a cut-away section is formed on the at least one circuit substrate to avoid the wiping mechanism.

11. A liquid discharging apparatus comprising:

a liquid discharging head that discharges a liquid onto a medium; a wiping mechanism that wipes a liquid discharging surface of the liquid discharging head and has a wiper portion that moves along a first direction that is along the liquid discharging surface and wipes the liquid discharging surface;

and an electric portion that is a portion related to controlling the liquid discharging apparatus, wherein the electric portion includes a first unit that includes a first circuit substrate that is provided while being oriented along a side of an apparatus main body, and a second unit that is disposed to face the first unit and includes a second circuit substrate, the second circuit substrate being located at an apparatus inner side with respect to the first circuit substrate and provided while being oriented along a surface of the first circuit substrate, the first direction intersects the surface of the circuit substrate, in the first direction, at least a part of the first circuit substrate overlaps a part of the wiping mechanism, the first unit includes a connector at a position facing the second unit, and the second unit includes a recess at a position facing the connector.

12. The liquid discharging apparatus according to claim 11, wherein in the first direction, at least a part of the second circuit substrate overlaps a part of the wiping mechanism.

13. The liquid discharging apparatus according to claim 11, wherein the recess extends in a direction intersecting an overlapping direction of the first unit and the second unit.

14. The liquid discharging apparatus according to claim 11, wherein in an overlapping direction of the first unit and the second unit, a part of the recess overlaps a part of an electronic component included in the second circuit substrate.

15. The liquid discharging apparatus according to claim 14, further comprising:

a duct that exhausts air from the second unit, wherein the duct extends from the second unit to a side of the apparatus main body via a lateral side of the first unit.

16. The liquid discharging apparatus according to claim 11, further comprising:

a fan that generates an airflow inside the second unit, wherein the second circuit substrate includes a heat sink at a position facing a back side of the recess.

* * * * *